(12) United States Patent
Marguerin et al.

(10) Patent No.: US 11,409,923 B1
(45) Date of Patent: Aug. 9, 2022

(54) SYSTEMS AND METHODS FOR GENERATING REDUCED ORDER MODELS

(71) Applicant: Ansys, Inc., Canonsburg, PA (US)

(72) Inventors: Stephane Marguerin, Canonsburg, PA (US); Michel Rochette, Canonsburg, PA (US); Bernard Dion, Canonsburg, PA (US); Lucas Boucinha, Canonsburg, PA (US)

(73) Assignee: Ansys, Inc, Canonsburg, PA (US)

( * ) Notice: Subject to any disclaimer, the term of this patent is extended or adjusted under 35 U.S.C. 154(b) by 505 days.

(21) Appl. No.: 16/253,635

(22) Filed: Jan. 22, 2019

Related U.S. Application Data

(60) Provisional application No. 62/619,970, filed on Jan. 22, 2018.

(51) Int. Cl.
| | | |
|---|---|---|
| *A61F 2/28* | (2006.01) | |
| *G06Q 50/18* | (2012.01) | |
| *G06Q 20/40* | (2012.01) | |
| *G06N 3/04* | (2006.01) | |
| *G06F 30/23* | (2020.01) | |
| *G06F 30/20* | (2020.01) | |
| *G06N 3/12* | (2006.01) | |
| *G06F 111/10* | (2020.01) | |

(52) U.S. Cl.
CPC ............. *G06F 30/20* (2020.01); *G06N 3/126* (2013.01); *G06F 2111/10* (2020.01)

(58) Field of Classification Search
CPC ...... G06F 30/20; G06F 2111/10; G06N 3/126
USPC ...................................................... 706/1–62
See application file for complete search history.

(56) References Cited

U.S. PATENT DOCUMENTS

| | | | | |
|---|---|---|---|---|
| 9,749,768 | B2* | 8/2017 | Peters ..................... | H04S 7/40 |
| 2006/0167784 | A1* | 7/2006 | Hoffberg .............. | G06Q 50/188 |
| | | | | 705/37 |
| 2007/0087756 | A1* | 4/2007 | Hoffberg ............... | G06Q 20/40 |
| | | | | 455/450 |
| 2007/0111246 | A1* | 5/2007 | Carrick ................. | G16B 40/00 |
| | | | | 435/6.12 |
| 2008/0216038 | A1* | 9/2008 | Bose ..................... | G06F 30/392 |
| | | | | 716/118 |
| 2010/0317420 | A1* | 12/2010 | Hoffberg .............. | G07F 17/323 |
| | | | | 463/1 |
| 2012/0179426 | A1* | 7/2012 | Fontes ................... | G06F 30/23 |
| | | | | 703/1 |
| 2014/0363481 | A1* | 12/2014 | Pasini ..................... | A61F 2/36 |
| | | | | 424/423 |
| 2016/0321384 | A1* | 11/2016 | Pal ........................ | B33Y 50/02 |
| 2018/0260503 | A1* | 9/2018 | Dweik .................. | G06N 7/023 |

* cited by examiner

*Primary Examiner* — Brandon S Cole

(57) ABSTRACT

Systems and methods for generating reduced order models are provided herein. In embodiments, a set of learning points is identified in a parametric space. A 3D physical solver may be used to perform a simulation for each learning point in the set of learning points to generate a learning data set, where the 3D physical solver is selected from a plurality of compatible 3D physical solvers for simulating different physical aspects of a product or process. The learning data set may be compressed to reduce the learning data set to a smaller set of vectors. Coefficients from the learning data set and the smaller set of vectors may then be used to interpolate a set of coefficients within a design space for the reduced order model.

20 Claims, 29 Drawing Sheets

1- Edit the Design of Experiments component

| | A | B |
|---|---|---|
| 1 | ☐ ROM Builder | |
| 2 | ☐ Design of Experiments (RBU) | |
| 3 | ROM Builder | Import Design Points |
| | Pipe 30 | ✎ Edit |

2- Select the Design Experiments node

Outline of Schematic B2: Design of Experiments (RB)

| | A | B |
|---|---|---|
| 1 | | Enabled |
| 2 | ✓ Design of Experiments (RB) | ☐ |
| 3 | ☐ Input Parameters | |
| 4 | ⊞ ☐ Fluent (A1) | |
| 5 | ℓₚ P1-temperature-1 | ☑ |
| 6 | ℓₚ P2-temperature-2 | ☑ |
| 7 | ℓₚ P3-V-inlet-2 | ☑ |
| 8 | ℓₚ P4-V-inlet-1 | ☑ |
| 9 | ☐ Output Parameters | |
| 10 | ⊞ ☐ Fluent (A1) | |
| 11 | ℓₚ P5-outlet-temperature | |
| 12 | Charts | |

3- Check that Optimal Space-Filling is selected and 32 design points will be run Properties of Outline A2: Design of Experiments (RB)

| | A | B |
|---|---|---|
| | Property | Value |
| 1 | | |
| 2 | ⊟ Design Points | |
| 3 | Preserve Design Points After DX Run | ☐ |
| 4 | ⊞ Failed Design Points Management | |
| 5 | Number of Retries | |
| 6 | ⊟ Design of Experiments | |
| 7 | Design of Experiments Type | Optimal Space-Filling Design |
| 8 | Design Type | Max-Min Distance |
| 9 | Maximum Number of Cycles | 10 |
| 10 | Samples Type | User-Defined Samples |
| 11 | Random Generator Seed | 0 |
| 12 | Number of Samples | 32 |
| 13 | ⊞ Design Point Report | |
| 14 | Report Image | None |

*Fig. 9*

| | Unsaved Project - Workbench |
|---|---|

File  Edit  View  Tools  Units  Extensions  Jobs  Help

☐ Project / ☐ B2:Design of Experiments (RB)

(☐ Update  ☐ Preview)  ☐ Clear Generated Data  ☐ Refresh  ☐ Approve Genera

Outline of Schematic A2: Design of Experiments (RB)

| | A | B |
|---|---|---|
| 1 | | Enabled |
| 2 | ⊟ ✓ Design of Experiments (RBU) | |
| 3 | ⊟ Input Parameters | |
| 4 | ⊟ ☐ Fluent (A1) | |
| 5 | $C_p$ P1-temperature-1 | ☑ |
| 6 | $C_p$ P2-temperature-2 | ☑ |
| 7 | $C_p$ P3-V-inlet-2 | ☑ |
| 8 | $C_p$ P4-V-inlet-1 | ☑ |
| 9 | ⊟ Output Parameters | |
| 10 | ⊟ ☐ Fluent (A1) | |
| 11 | $p_J$ P5-outlet-temperature | |
| 12 | ⊟ Charts | |
| 13 | ✓☐ Parameters Parallel | |
| 14 | ✓☐ Design Points vs Parameter | |

Properties of Outline A2: Design of Experiments (RB)

| | A | B |
|---|---|---|
| 1 | Property | Value |
| 2 | ⊟ Design Points | |
| 3 | Preserve Design Points After DX Run | ☐ |
| 4 | ⊟ Failed Design Points Management | |
| 5 | Number of Retries | |
| 6 | ⊟ Design of Experiments | |
| 7 | Design of Experiments Type | Optimal Space-Filling Design |
| 8 | Design Type | Max-Min Distance |
| 9 | Maximum Number of Cycles | 10 |
| 10 | Samples Type | User-Defined Samples |
| 11 | Random Generator Seed | 0 |
| 12 | Number of Samples | 32 |
| 13 | ⊟ Design Point Report | |
| 14 | Report Image | None |

Table of Outline

| | A |
|---|---|
| 1 | Name |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |
| 17 | 16 |
| 18 | 17 |
| 19 | 18 |
| 20 | 19 |
| 21 | 20 |
| 22 | 21 |
| 23 | 22 |
| 24 | 23 |
| 25 | 24 |
| 26 | 25 |
| 27 | 26 |
| 28 | 27 |
| 29 | 28 |
| 30 | 29 |
| 31 | 30 |
| 32 | 31 |
| 33 | 32 |

Chart: No Data

MATCH TO FIG. 11B

*Fig. 11A* ted Data

A2: Design Points of Design of Experiments

| P1 - temperature-1 (K) | P2 - temperature-2 (K) | P3 - V-inlet-2 (ms^-1) | P4 - V-inlet-1 (ms^-1) | P5 - outlet-temperature (K) |
|---|---|---|---|---|
| 299.56 | 283.94 | 0.18844 | 0.28031 | 293.17 |
| 327.69 | 355.81 | 0.73969 | 0.92344 | 340.29 |
| 277.69 | 287.06 | 0.58656 | 0.61719 | 282.27 |
| 333.94 | 296.44 | 0.95406 | 0.67844 | 312.19 |
| 302.69 | 371.44 | 0.40281 | 0.70906 | 328.15 |
| 358.94 | 340.19 | 0.89281 | 0.31094 | 345.26 |
| 280.81 | 318.31 | 0.49469 | 0.12719 | 310.26 |
| 355.81 | 349.56 | 0.30194 | 0.86219 | 354.08 |
| 287.06 | 305.81 | 0.92344 | 0.34156 | 300.53 |
| 293.31 | 293.31 | 0.15781 | 0.77031 | 293.53 |
| 296.44 | 312.06 | 0.77031 | 0.95406 | 303.47 |
| 346.44 | 302.69 | 0.37219 | 0.035313 | 306.48 |
| 337.06 | 365.19 | 0.127.19 | 0.43344 | 343.81 |
| 330.81 | 308.94 | 0.86219 | 0.096563 | 311.13 |
| 343.31 | 352.69 | 0.46406 | 0.065938 | 351.5 |
| 365.19 | 327.69 | 0.83156 | 0.80094 | 346.09 |
| 321.44 | 321.44 | 0.52531 | 0.49469 | 321.44 |
| 315.19 | 274.56 | 0.64781 | 0.24969 | 286.31 |
| 324.56 | 277.69 | 0.55594 | 0.83156 | 305.52 |
| 274.56 | 343.31 | 0.67844 | 0.64781 | 309.72 |
| 305.81 | 358.94 | 0.80094 | 0.18844 | 348.31 |
| 308.94 | 333.94 | 0.28031 | 0.98469 | 314.76 |
| 368.31 | 290.19 | 0.70906 | 0.40281 | 319.12 |
| 283.94 | 337.06 | 0.096563 | 0.55594 | 292.56 |
| 318.31 | 324.56 | 0.065938 | 0.15781 | 320.27 |
| 312.06 | 346.44 | 0.98469 | 0.58656 | 333.36 |
| 362.06 | 299.56 | 0.43344 | 0.89281 | 341.01 |
| 371.44 | 330.81 | 0.24969 | 0.37219 | 354.88 |
| 349.56 | 280.81 | 0.21906 | 0.46406 | 326.76 |
| 290.19 | 362.06 | 0.34156 | 0.21906 | 333.49 |
| 340.19 | 315.19 | 0.035313 | 0.73969 | 337.39 |
| 352.69 | 368.31 | 0.61719 | 0.52531 | 361.1 |

MATCH TO FIG. 11A

| B | C | D | Da |
|---|---|---|---|
| Ce... | Size | Type | |
| A3 | 111 KB | FLUENT Interpolation D | 12/12/2 |
| Global | 20 KB | ROM Snapshot Cache f | 12/12/2 |
| A3 | 127 KB | FLUENT case File | 12/12/2 |
| | | FLUENT Data File | 12/12/2 |
| Global | 11 | ROM Snapshot File | 12/12/2 |
| Global | 17 | ROM Snapshot File | 12/12/2 |
| Global | 93. | ROM Mesh File | 12/12/2 |
| Global | 17 | ROM Snapshot File | 12/12/2 |
| Open Containing Folder | | ROM Snapshot File | 12/12/2 |
| File Type Filter... | | ROM Snapshot File | 12/12/2 |
| Copy | | ROM Snapshot File | 12/12/2 |
| Display File Info (Beta | | ROM Snapshot File | 12/12/2 |
| Global | 17 | ROM Snapshot File | 12/12/2 |
| Global | 17 | ROM Snapshot File | 12/12/2 |
| Global | 17 | ROM Snapshot File | 12/12/2 |
| Global | 17 | ROM Snapshot File | 12/12/2 |
| Global | 17 | ROM Snapshot File | 12/12/2 |
| Global | 17 | ROM Snapshot File | 12/12/2 |

File Info
Binary ROM Object
Supports of each component

"inlet-1"
"mass-imbalance", "heat-flux", "wall-shear", "thermal-conductivity-lam", "enthalpy", "temperature", "velocity-angle", "z-velocity", "y-velocity", "x-velocity", "density", "pressure"
"inlet-2"
"mass-imbalance", "heat-flux", "wall-shear", "thermal-conductivity-lam", "enthalpy", "temperature", "velocity-angle", "z-velocity", "y-velocity", "x-velocity", "density", "pressure"
"interior-solid"
"mass-imbalance", "heat-flux", "wall-shear", "thermal-conductivity-lam", "enthalpy", "temperature", "velocity-angle", "z-velocity", "y-velocity", "x-velocity", "density", "pressure"
"outlet"
"mass-imbalance", "heat-flux", "wall-shear", "thermal-conductivity-lam", "enthalpy", "temperature", "velocity-angle", "z-velocity", "y-velocity", "x-velocity", "density", "pressure"
"solid"
"mass-imbalance", "heat-flux", "wall-shear", "thermal-conductivity-lam", "enthalpy", "temperature", "velocity-angle", "z-velocity", "y-velocity", "x-velocity", "density", "pressure"
"symmetry"
"mass-imbalance", "heat-flux", "wall-shear", "thermal-conductivity-lam", "enthalpy", "temperature", "velocity-angle", "z-velocity", "y-velocity", "x-velocity", "density", "pressure"
"wall"

|   | B |
|---|---|
| 1 | ☐ ROM Builder |
| 2 | ☐ Design of Experiments (RB) ✓ |
| 3 | ☐ ROM Builder ? |

ROM Build
- ✏ Edit...
- ☐ Export ROM (beta)
- ☐ Duplicate
- Transfer Data From New ▷

Outline of Schematic B3: ROM Builder

|   | A | B |
|---|---|---|
| 1 |   | Enabled |
| 2 | ⊟ ? ROM Builder |   |
| 3 | ⊟ Input Parameters |   |
| 4 | ⊟ ☐ Fluent (A1) |   |
| 5 | P1-temperature-1 | ✓ |
| 6 | P2-temperature-2 | ✓ |
| 7 | P3-V-inlet-2 | ✓ |
| 8 | P4-V-inlet-1 | ✓ |
| 9 | ⊟ Output Parameters |   |
| 10 | ⊟ ☐ Fluent (A1) |   |
| 11 | P5-outlet-temperature |   |

Properties of Outline A2: ROM Builder

|   | A | B |
|---|---|---|
| 1 | Property | Value |
| 2 | ⊟ ROM Builder |   |
| 3 | Solver System |   |
| 4 | Construction Type | Fluent (FLU) |
| 5 | Maximum Relative Error | 0.01 |
| 6 | ⊟ Design Point Report |   |
| 7 | Report Image | None |

*Fig. 13*

2- Select the Rom Builder node from the Outline view.
3- Click the link Rom Builder.log in the properties view.

Properties of Outline A2: ROM Builder

| | A | B |
|---|---|---|
| 1 | Property | Value |
| 2 | ROM Builder | |
| 3 | Construction Type | Fixed Accuracy |
| 4 | Maximum Relative Error | 0.01 |
| 5 | Projection Strategy | Mixed |
| 6 | Store Snapshots | |
| 7 | Log File | |
| 8 | Log | RomBuilder.log |

Pipe3d: Rom reduction: Log File

Rom reduction: Log File romutils 0.4.0

Building reduced model.
Configuration file: C:\Users\smarguer\pipe3d_pending\RBU\Velocity.conf READING DATA
Parameter Count :  4
Parameter Names :
    temperature-1
    temperature-2
    V-inlet-1
    V-inlet-2

Reading file 1 : C:\Users\smarguer\pipe3d_files\dpall\global\DX\RBU\ds1.bin
    Parametric config :    323    363    0.4316    0.0788
Reading file 2 : C:\Users\smarguer\pipe3d_files\dpall\global\DX\RBU\ds10.bin
    Parametric config :    307    331    0.51    0.9804
Reading file 3 : C:\Users\smarguer\pipe3d_files\dpall\global\DX\RBU\ds11.bin
    Parametric config :    291    319    0.0788    0.1964
Reading file 4 : C:\Users\smarguer\pipe3d_files\dpall\global\DX\RBU\ds12.bin
    Parametric config :    343    347    0.9804    0.4708
Reading file 5 : C:\Users\smarguer\pipe3d_files\dpall\global\DX\RBU\ds13.bin
    Parametric config :    339    295    0.3532    0.1572

*Fig. 15B*

SYSTEMS AND METHODS FOR GENERATING REDUCED ORDER MODELS

CROSS-REFERENCE TO RELATED APPLICATION

This application claims priority to U.S. Provisional Application No. 62/619,970, filed on Jan. 22, 2018, the entirety of which is incorporated by reference herein.

TECHNICAL FIELD

The technology described herein relates generally to parametric reduced order models.

BACKGROUND

Reduced order modeling is well mastered for many linear problems, such as structural dynamics, electronic circuit analysis, or linear time invariant (LTI) system analysis. However, classical model reduction methods used for linear problems often fail in the case of parametric non-linear models.

SUMMARY

Systems and methods for generating reduced order models are provided herein. In embodiments, a set of learning points is identified in a parametric space. A 3D physical solver may be used to perform a simulation for each learning point in the set of learning points to generate a learning data set, where the 3D physical solver is selected from a plurality of compatible 3D physical solvers for simulating different physical aspects of a product or process. The learning data set may be compressed to reduce the learning data set to a smaller set of vectors. Coefficients from the learning data set and the smaller set of vectors may then be used to interpolate a set of coefficients within a design space for the reduced order model.

An illustrative example of a ROM production operation using ANSYS Fluent software is depicted in FIGS. 8-15.

Figure 16A:
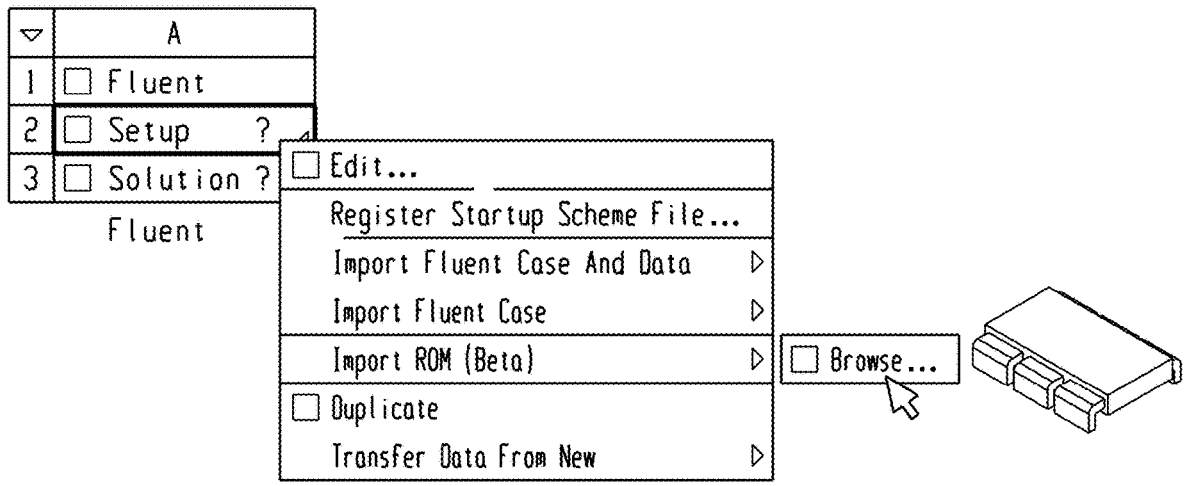
Figure 16B:
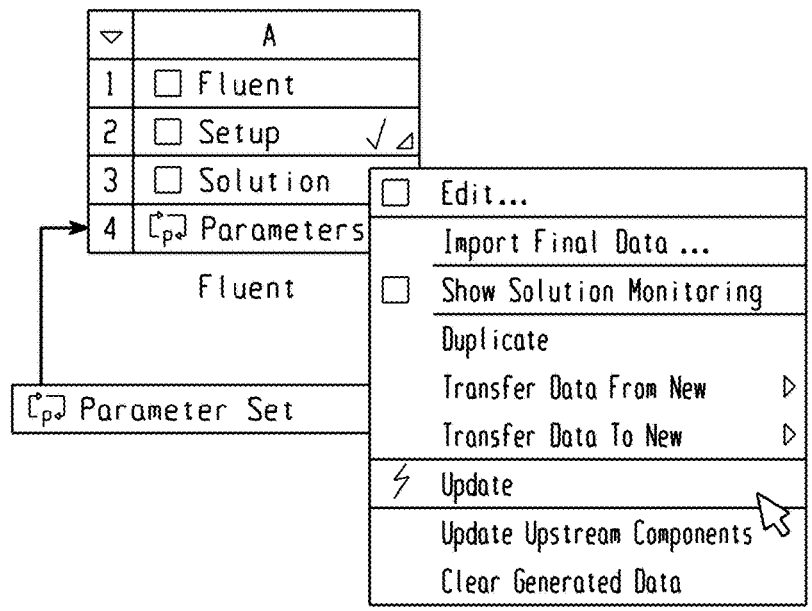
Figure 17A:
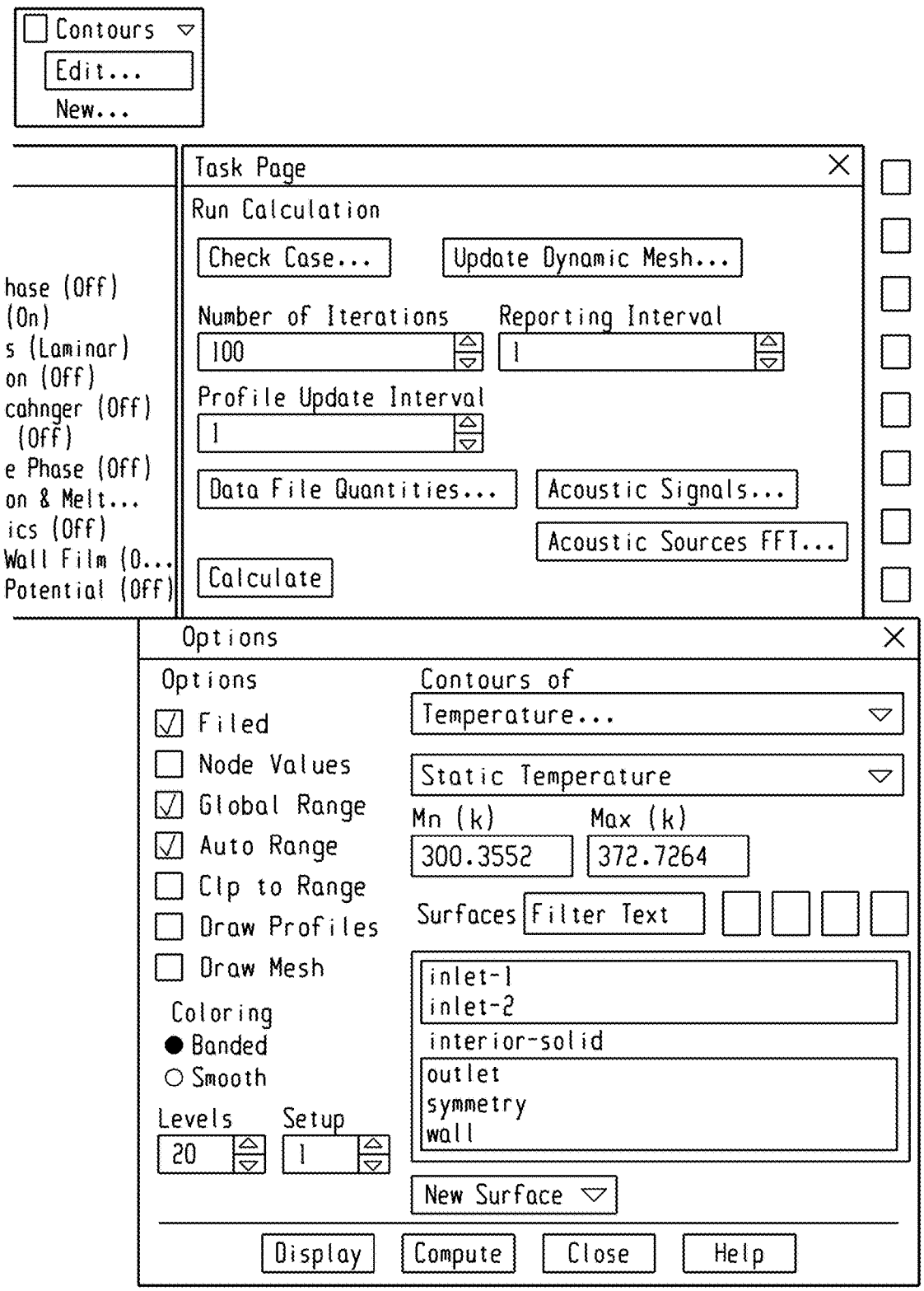
Figure 17B:
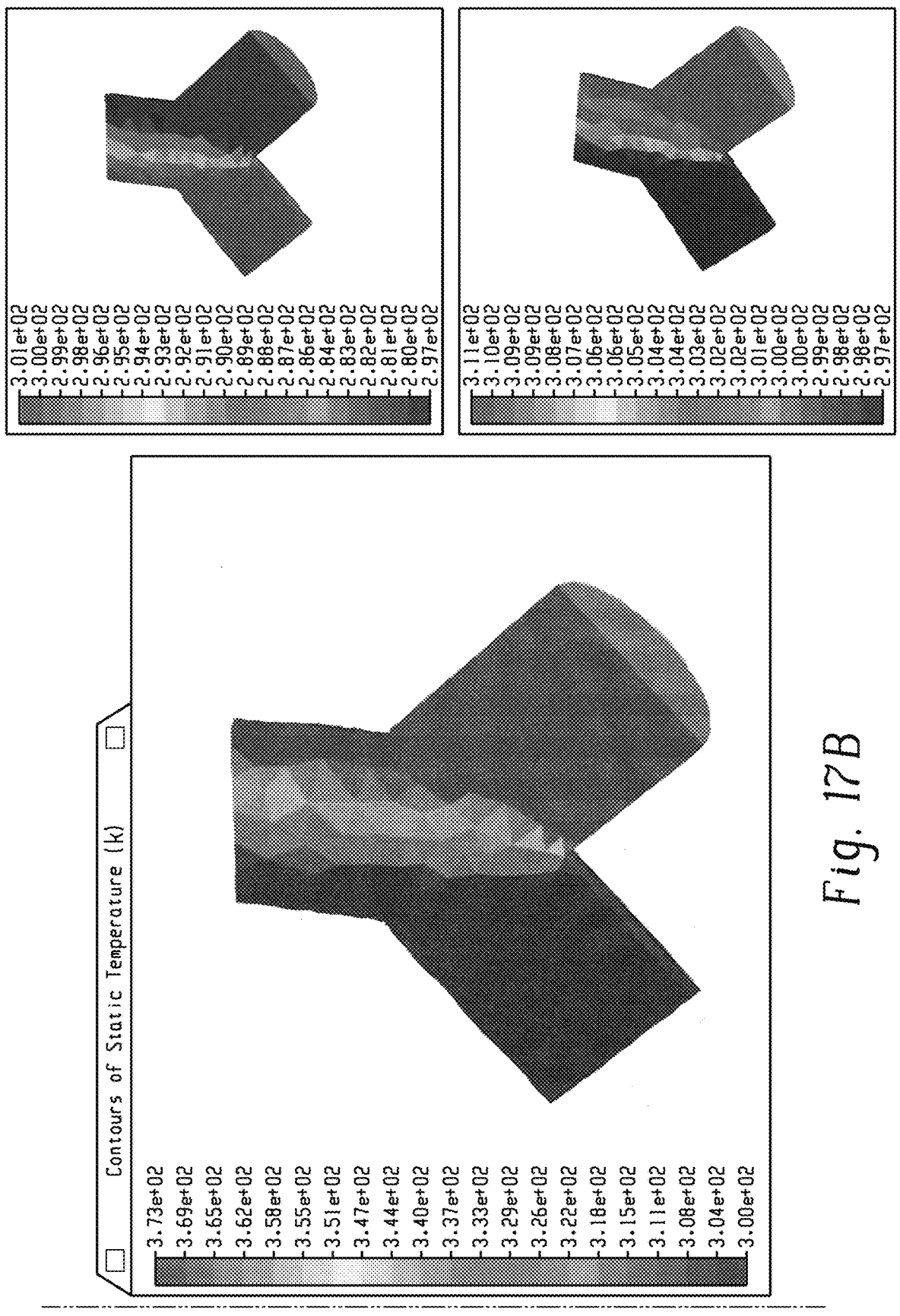

An illustrative example of ROM consumption for performing a parametric study is depicted in FIGS. 16-17.

Figure 18A:
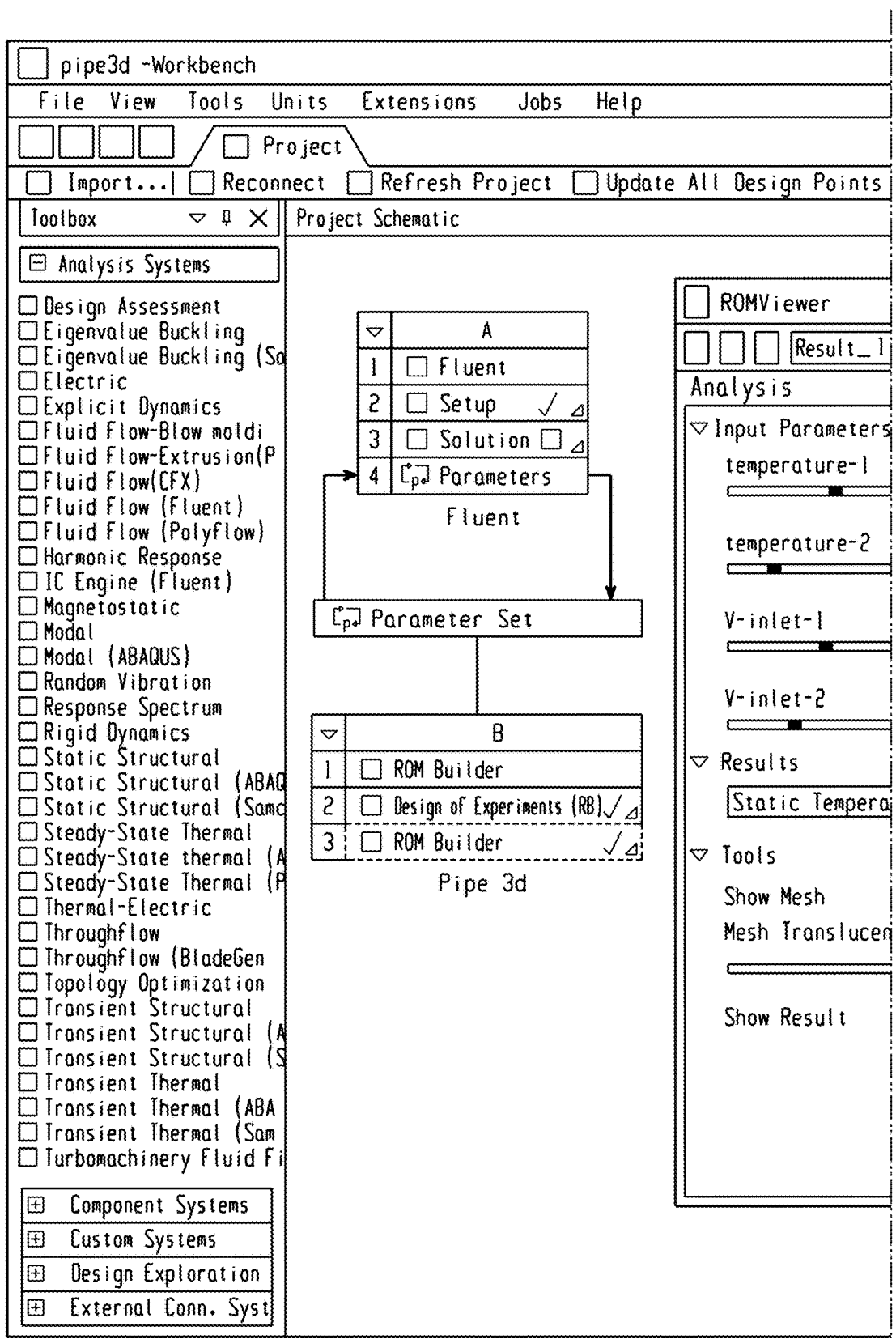
Figure 18B:
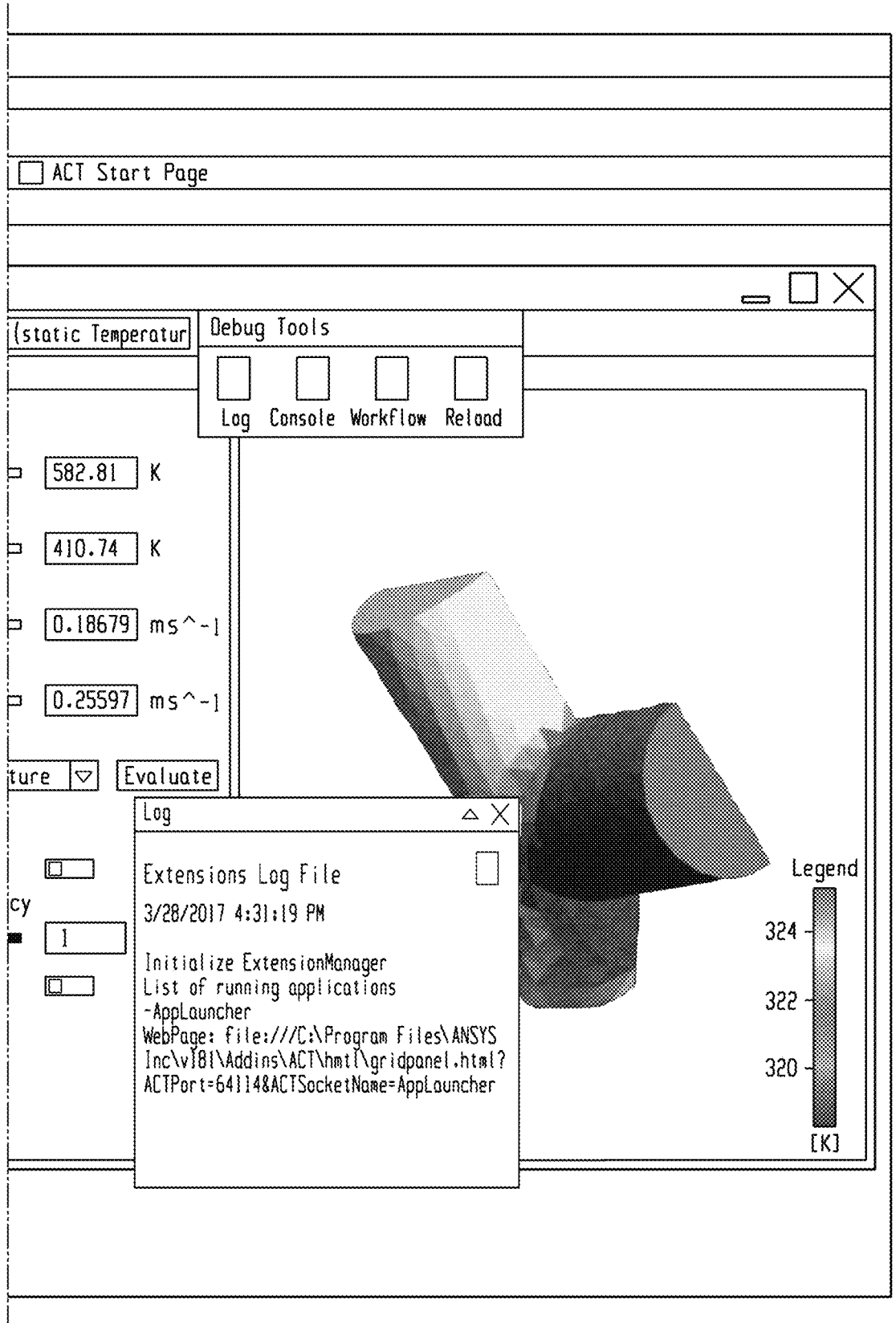
Figure 19:
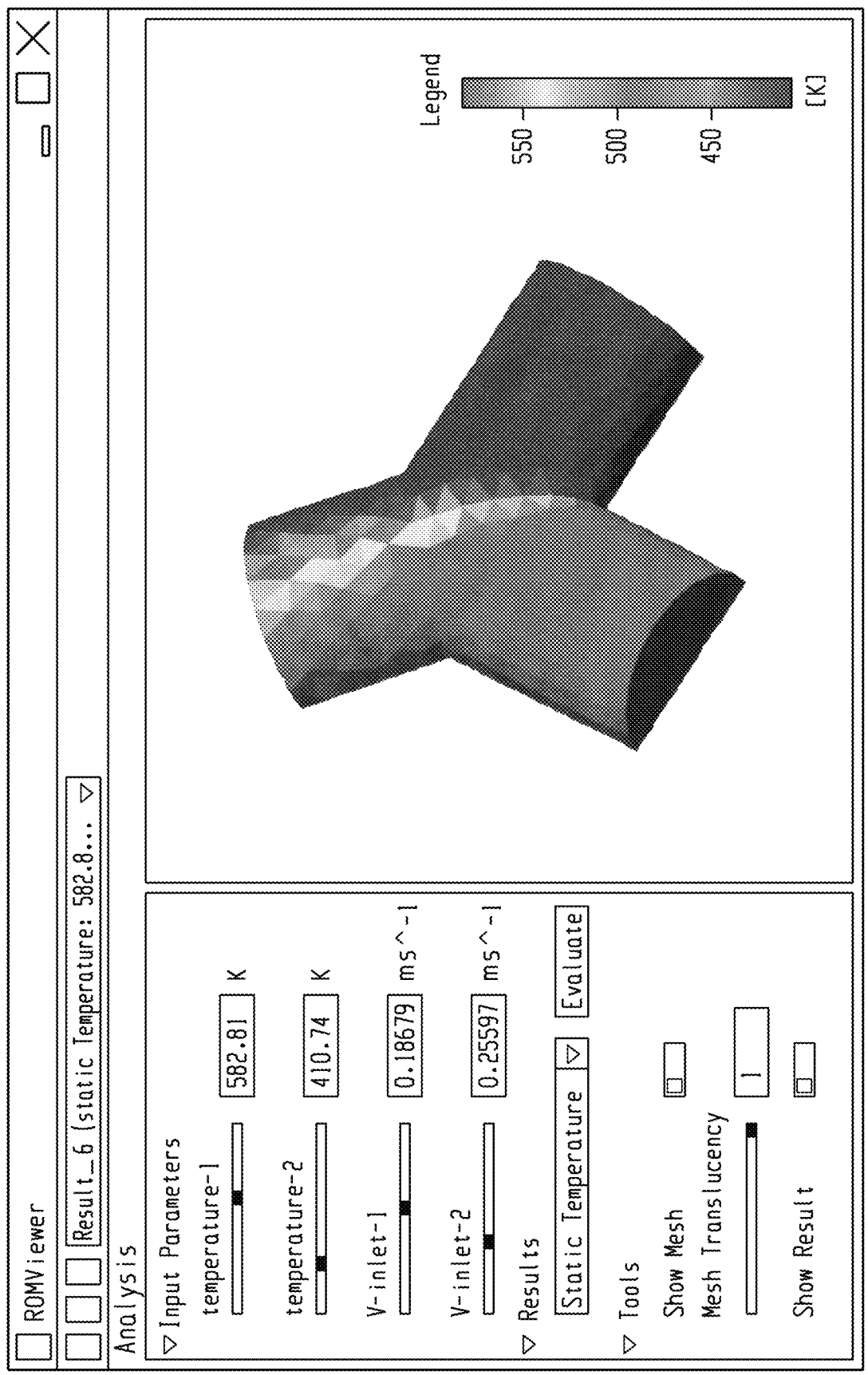

An illustrative example of ROM consumption using a ROM viewer software application 602 is depicted in FIGS. 18-19.

Figure 20:
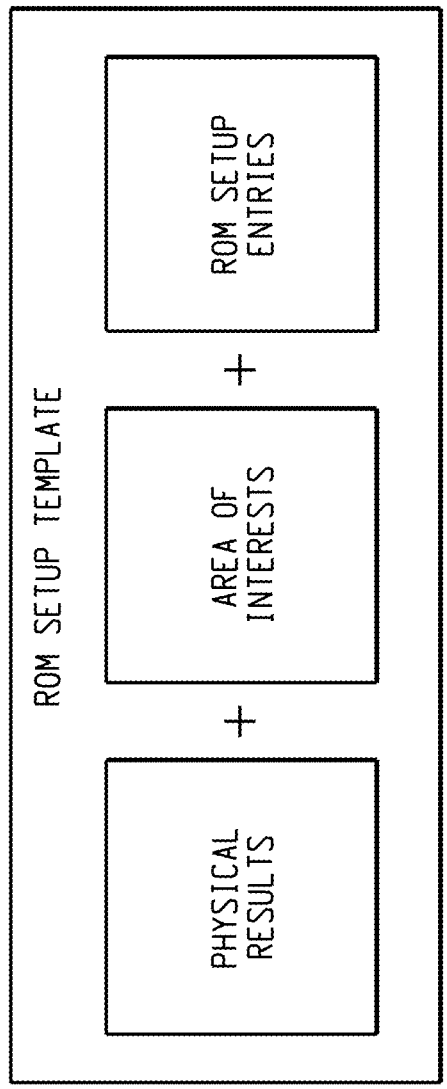
Figure 21:
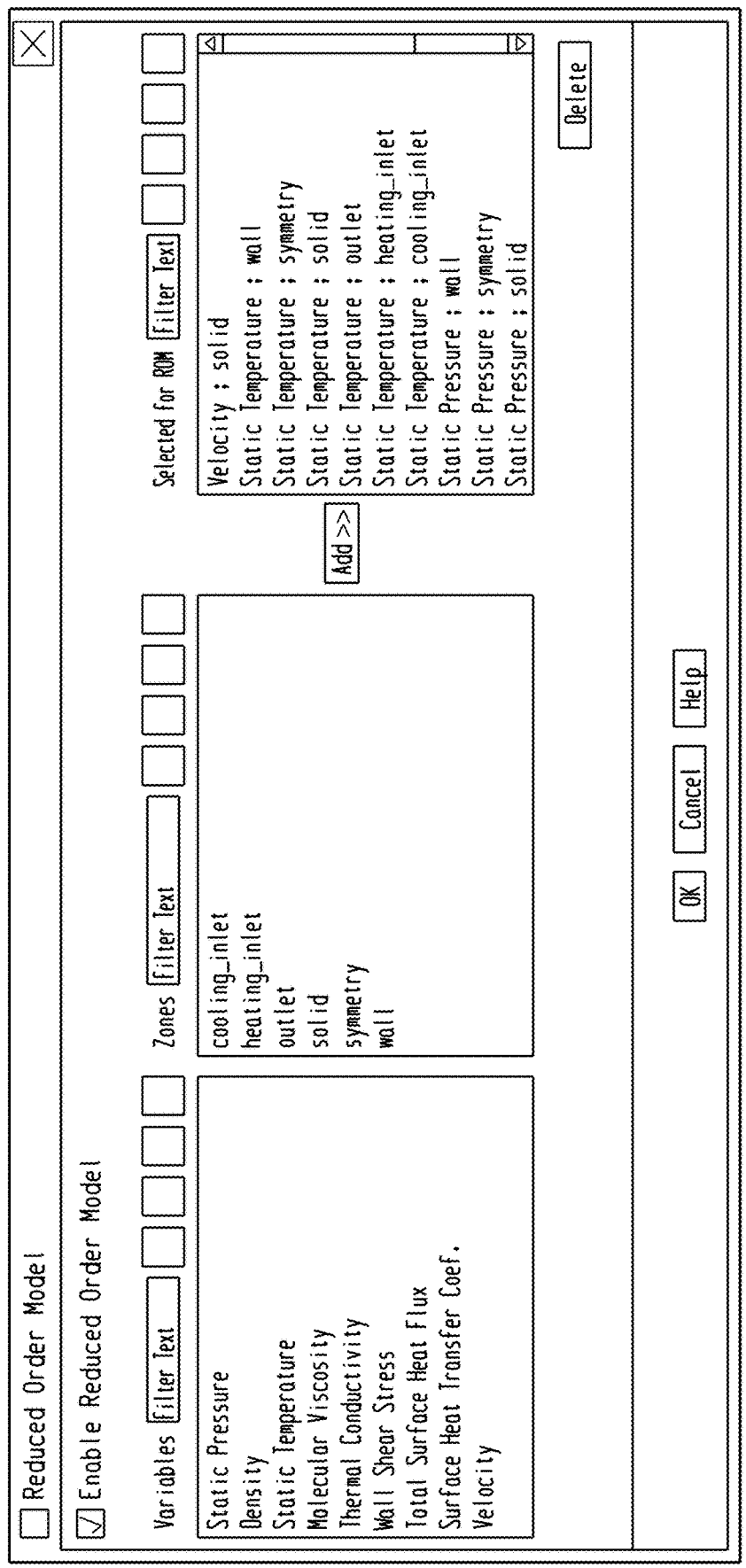

FIGS. 20-21 shown an illustrative example of ROM setup.

FIGS. 22, 23A, 23B and 23C depict example computer-implemented environments.

DETAILED DESCRIPTION

Figure 1:
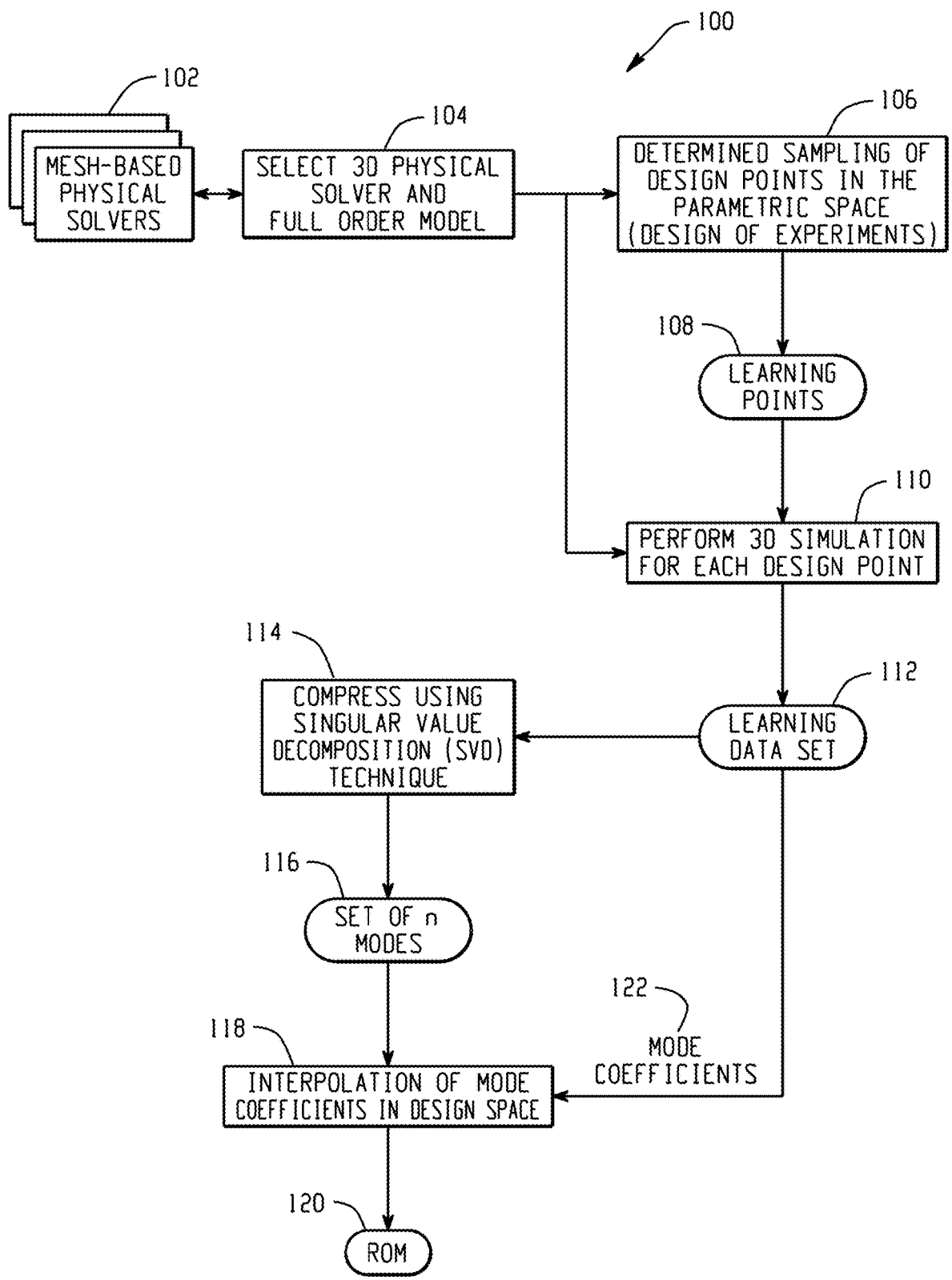
FIG. 1 is a diagram of an example method for generating a reduced order model (ROM) of a full solver model from any one of a plurality of mesh-based physical solvers.

FIG. 1 is a diagram of an example method 100 for generating a reduced order model (ROM) of a full solver model from any one of a plurality of mesh-based physical solvers 102. At step 104, a full order 3D model is selected from one of the plurality of mesh-based (3D) physical solvers 102 from which the ROM is to be built. The plurality of mesh-based physical solvers 102 may, for example, include any mesh-based solvers for simulating different physical aspects of a product or process, such as fluid dynamic solvers, electrical solvers, thermal solvers, mechanical solvers, etc. Examples of the plurality of mesh-based physical solvers 102 may include the ANSYS Fluent fluid dynamics solver, ANSYS Mechanical solver, ANSYS Icepack solver, ANSYS CFX solver, ANSYS HFSS solver, ANSYS Maxwell solver, among others. Advantageously, the illustrated example 100 provides a generic and nonintrusive method for building a parametric ROM from any of the different mesh-based physical solvers 102, where the resultant ROM provides an accurate approximation of the 3D solver solution for given values of input parameters.

The illustrated method 100 derives the physics of the simulated problem from a collection of full order model results associated with input parameter values. For this reason, the example method 100 is general and does not require adaption to the specific physics. Specifically, at step 106 a sampling of design points 108 in the parametric space is determined using a design of experiments (DoE) sampling operation, which may, for example, utilize an Optimal Space Filling (OSF) technique. For example, consider the following full order model given by a mesh-based physical solver 102:

$$f(X,p)+g=0, \quad (1)$$

where X is the discrete solution of size N, g is a first parameter corresponding to one or several excitations representing the environment of the simulated system, and p is a second parameter describing the internal state of the system. In general, the dependency of X on the parameters p and g is not linear. A design of experiments (DoE) sampling operation, such as OSF, is therefore used at 106 to select a learning set of design points 108 defined in the Cartesian product of g and p variation ranges. The DoE sampling operation may, for example, be performed using the OFS Design of Experiments function provided by the ANSYS DesignXplorer software sold by Ansys, Inc. of Canonsburg, Pa. An example is illustrated in FIGS. 2A-2C.

Figure 2A:
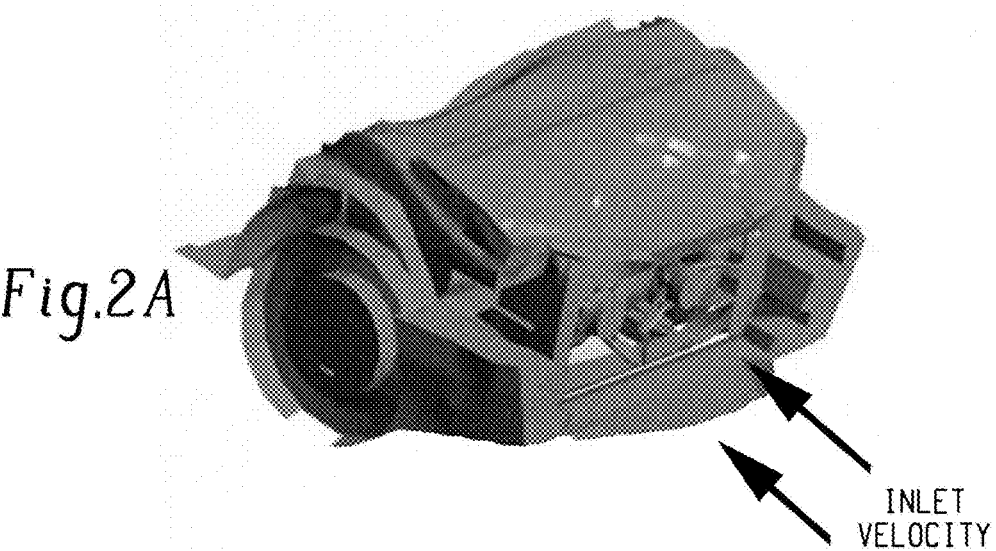
FIGS. 2A-2C depict an example of design of experiments (DoE) learning points selected for a thermodynamic model of a combustion engine.
Figure 2B:
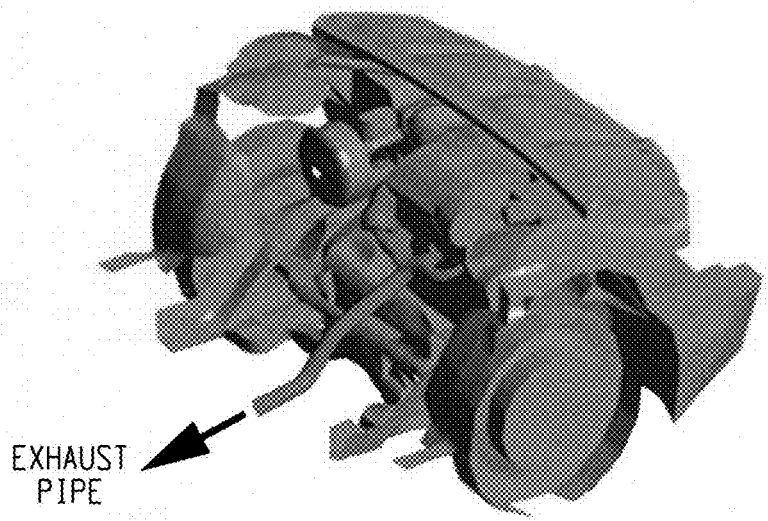
Figure 2C:
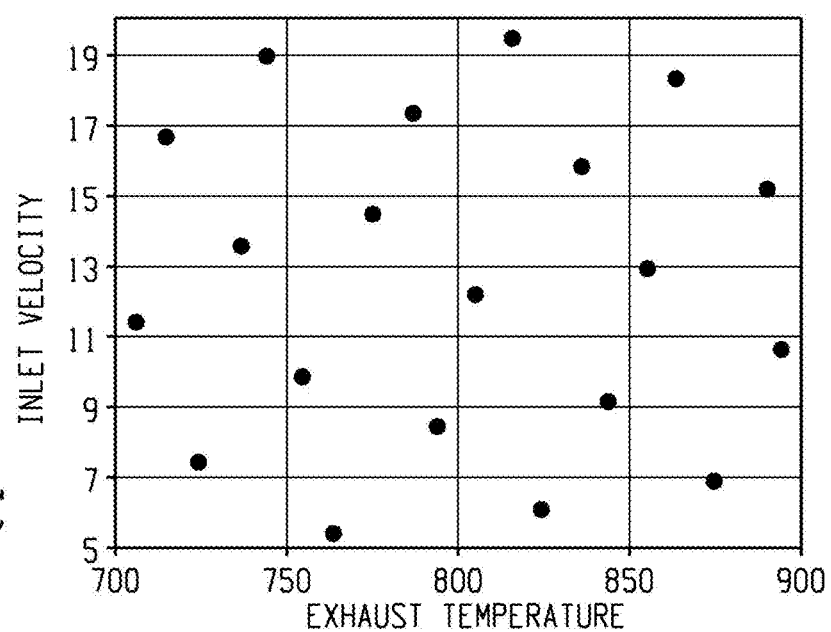

In the example illustrated in FIGS. 2A-2C, a parametric ROM is to be generated from a full 3D thermodynamic model of a combustion engine. As illustrated in FIGS. 2A and 2B, the parametric space for the ROM includes two parameters, the engine's inlet velocity (FIG. 2A) and the exhaust temperature of the engine's exhaust pipe (FIG. 2B). In the illustrated example, the inlet velocity may vary from 5 m/s to 20 m/s and the exhaust temperature may vary from 700k to 900k. From this parametric space, an OSF sampling operation is used to select a predetermined number of learning points, as illustrated in FIG. 2C. In the example shown in FIG. 2C, twenty learning points are selected on the parametric space defined by the range of the inlet velocity parameter (on the y axis) and the exhaust temperature parameter (on the x axis). However, in other examples, more or less learning points may be selected, which may affect the accuracy of the resultant ROM.

With reference again to FIG. 1, once the set of learning points 108 has been selected, the full order 3D model is used at step 110 to perform a 3D simulation for each of the learning points 108. The result of these simulations is a learning data set 112 (also sometimes referred to as data snapshots.) Referring to the example full order model represented above by Equation (1), the mesh-based physical solver (104) is used to solve this equation for the values of parameters g and p included in the set of learning points 108. Consider a steady state case with the following set of learning points for g and p: $(g^0, g^1, \ldots, g^K)$ and $(p^0, p^1, \ldots, p^K)$. The learning data set 112 would then be:

$$X=(X^0, X^1, \ldots, X^K), \quad (2)$$

where $X^k$ is the solution for Equation (1) for $p=p^k$ and $g=g^k$ for $k=0, \ldots, K$.

At step 114, the learning data set 112 is compressed to reduce the data to an orthonormal set of n vectors 116 (referred to n modes). The compression may, for example, be performed using a truncated singular value decomposition (SVD) operation, such as described in G. H. Golub, et al., *Matrix Computations*, The John Hopkins University Press, ISBN 0-8018-5414-8 (1996). Referring again to the mathematical example set forth above, an SVD compression technique may be performed to compress X in Equation (2), such that $$X \approx Ux,$$

where $U=(U_1, U_2, \ldots, U_n)$ is an orthonormal set of n vectors (modes), with n being very small in comparison with the size N of the X vector. N being typically around 10 million values, while n being typically around 10. Each column of X is associated with the corresponding small column x such that $$x=U^T X \text{ and } X \approx Ux.$$

The number of modes n computed by the SVD operation at step 114 may, for example, be controlled based on a desired accuracy parameter that may be set by a user.

At step 118, an interpolation operation is used to generate the ROM 120, providing an accurate approximation of the 3D model solution everywhere in the design space. Using an iterative process, a set of n modes U may be determined where the linear combination Ux is an accurate approximation of the full model solution X everywhere in the design space. The interpolation operation at step 118 utilizes the exact set of mode coefficients 122 $(x^0, x^1, \ldots x^K)$ that were determined by the full simulation of the learning points 108 at step 110, and uses these mode coefficients 122 to provide an accurate interpolation of the n modes coefficients in the entire design space. The interpolation step 118 may, for example, be performed by building a surrogate model using the genetic aggregation response surface method of the ANSYS DesignXplorer software sold by Ansys, Inc. of Canonsburg, Pa., and refining the model to reach an expected ROM accuracy. The surrogate model may, for example, be generated at step 118 using the procedure described in Ben Salem M., et al., *Automatic Selection for General Surrogate Models* (2017).

Figure 3:
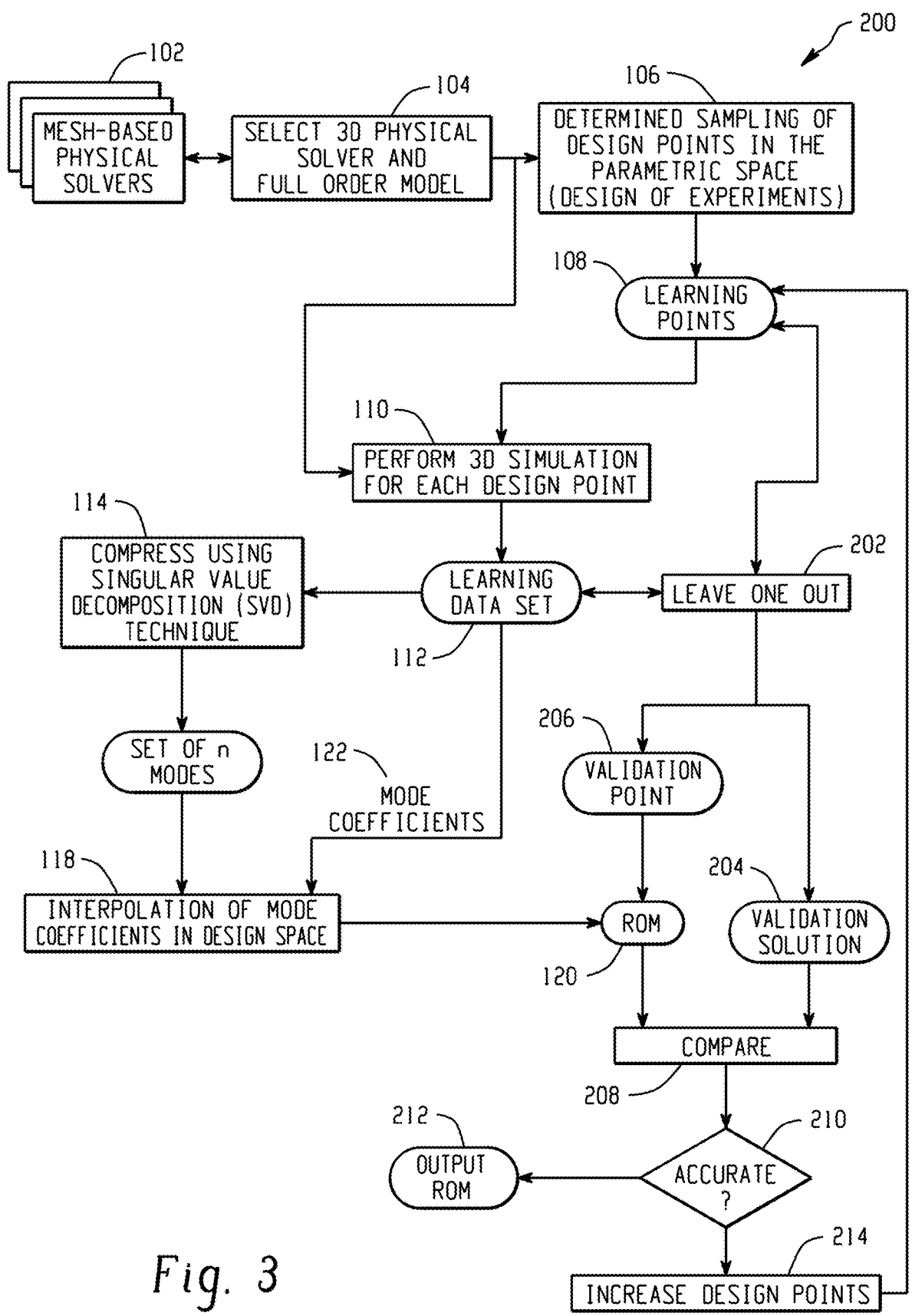
FIG. 3 is a diagram of another example method for generating a ROM

FIG. 3 is a diagram of another example method 200 for generating a reduced order model (ROM) of a full solver model from any one of a plurality of mesh-based physical solvers 102. In this example, a "leave one out" evaluation process is used to predict and further refine the accuracy of the ROM 120. Like the method described above with reference to FIG. 1, this example uses a design of experiments (DoE) process at step 106 to determine a set of learning points 108 on which a full 3D simulation is performed at step 110 to generate a learning data set 112. In this example, however, a leave one out process is utilized at step 202 to compare a validation solution 204 from the learning data set 112 for one validation point 206 of the learning points 108. The remaining solutions in the learning data set 112 are used in the compression 114 and interpolation 118 steps to generate the ROM 120, as described above with reference to FIG. 1. Then, at step 208, the held-out validation point 206 is input to the ROM 120 and the ROM result is compared with the validation solution 204 to measure the projection error of the ROM 120.

At step 210, the method determines if the level of measured accuracy for the ROM 120 is within an acceptable range. If so, then the final ROM is output and stored at step 212. Otherwise, if a more accurate ROM is desired, the number of DoE design points may be increased at step 214, and the method repeated from DoE step 108.

In certain examples, the method 200 may utilize the leave one out process described in Friedman, J., *The Elements of Statistical Learning* (Vol. 1, pp 241-249), New York: Springer Series in Statistics (2001).

As explained above with reference to FIG. 1, the ROM accuracy may also be affected by the optimal selection of the number of modes n utilized by the SVD compression process 114, which may be controlled based on a user accuracy parameter. Thus, two situations for convergence may be considered: (1) the desired user accuracy is reached using a given number of design points and an optimal set of modes; or (2) by increasing the number of modes the level of measured accuracy given by the leave one out approach does not decrease. In the second situation, the learning data set was not rich enough to reach the user accuracy, in which case new design points may be chosen to increase the learning data set of design points and further explore the parametric space, then repeating the ROM production process from step 106.

In embodiments, some or all of the processes depicted in FIGS. 1 and/or 3 may be repeated for each field included in ROM setup (for example as described below with reference to FIGS. 5 and 8-15).

Figure 4:
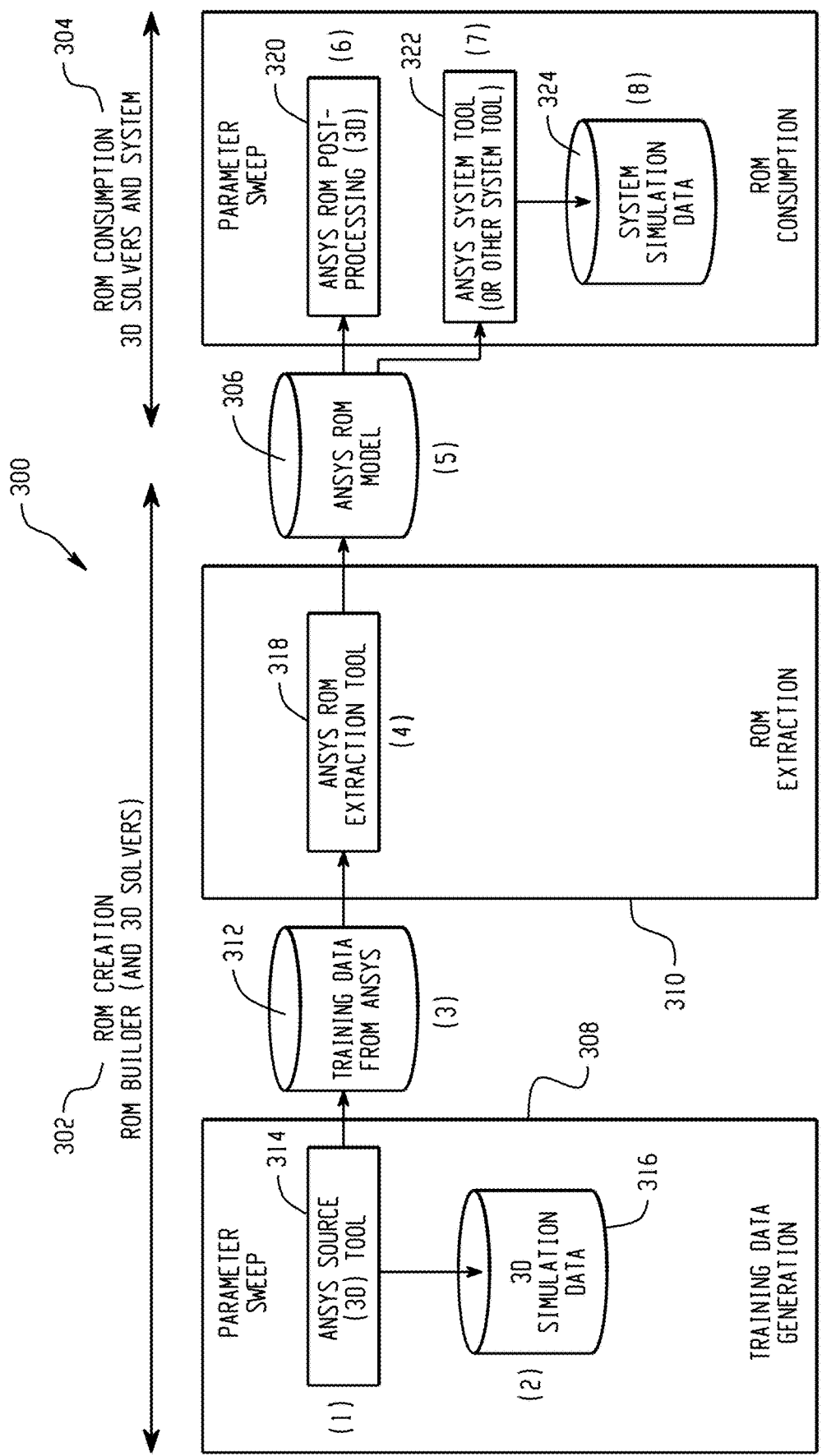
FIG. 4 is a diagram of an example system for generating a reduced order model of a full solver model from any one of a plurality of mesh-based physical solvers.

FIG. 4 is a diagram of an example system 300 for generating a reduced order model (ROM) of a full solver model from any one of a plurality of mesh-based physical solvers. The system depicted in FIG. 4 may, for example, be utilized to implement the methods illustrated in FIGS. 1 and 3.

The illustrated example includes a first plurality of system components 302 (referred to as "ROM creation" components) that may be utilized for ROM production, and a second plurality of system components 304 (referred to as "ROM consumption" components) that may utilize the ROM. Also illustrated is a non-transitory storage unit 306, such as a database, on which the ROM object (e.g., a .romz file) may be stored for subsequent use by one or more of the ROM consumption components 304. In embodiments the ROM object stored in non-transitory storage unit 306 may include a standalone ROM API library, a ROM mesh file, ROM data coherent with ROM setup, and the ROM setup file.

The ROM creation components 302 shown in the illustrated example 300 include a set of one or more training data generation components 308, a set of one or more ROM extraction components 310, and a non-transitory storage unit 312, such as a database, for storing the ROM training data.

The training data generation components 308 include a 3D simulation program 314, such as an ANSYS 3D simulation tool, that includes the desired mesh-based physical solver, and one or more full 3D physical models (3D simulation data) from which the ROM is to be built that are stored in a non-transitory storage unit 316, such as a database. The 3D simulation program 314 may, for example, be one of the ANSYS Fluent fluid dynamics solver, the ANSYS Mechanical solver, the ANSYS Icepack solver, the ANSYS CFX solver, or the ANSYS HFSS solver, the ANSYS Maxwell solver, among others. In operation, the 3D simulation program 314 and stored 3D physical model 316 may be used to generate a learning data set 312 (also referred to as training data) by running a full 3D simulation on a set of learning points selected using a design of experiments (DoE) process, as described above with reference to FIGS. 1-3.

The ROM extraction components 310 include a ROM extraction program 318 that is configured to perform compression and interpolation operations to generate the ROM 306 from the learning data set 312. The ROM extraction program 318 may, for example, be configured to perform the compression and interpolation operation describe above with reference to steps 114 and 118 of FIG. 1. In certain embodiments, the ROM extraction program 318 may be further configured to perform the "leave one out" accuracy validation and refinement operations described above with reference to steps 202, 208, 210 and 214 of FIG. 3.

Figure 5:
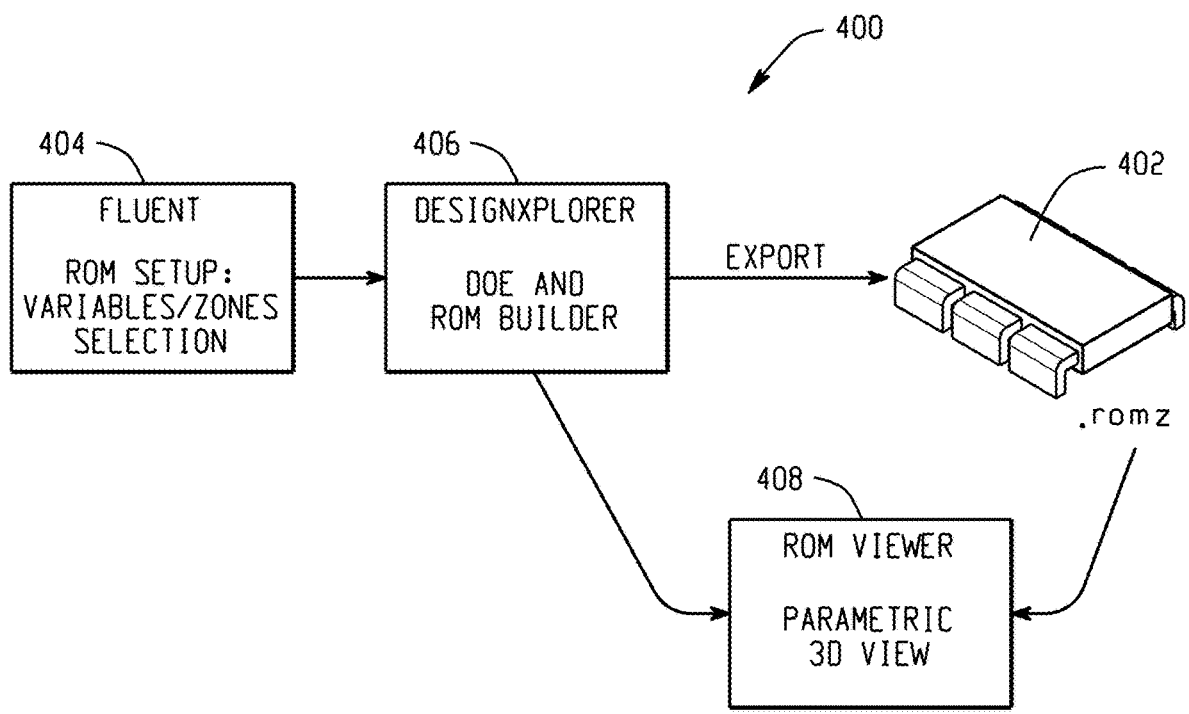
FIG. 5 depicts an example of software tools that may be configured for use in ROM creation.

An example of software tools that may be configured for use as the ROM creation components 302 is set forth in FIG. 5. In the example 400 illustrated in FIG. 5, a ROM 402 is produced using the ANSYS Fluent, and ANSYS DesignXplorer software applications sold by Ansys, Inc. of Canonsburg, Pa., along with a ROM viewer software application. The ANSYS Fluent software 404 is a computational fluid dynamics tool that includes a 3D physical solver, which may be used to create the learning data set, as described above with reference to step 110 of FIGS. 1 and 3. The ANSYS DesignXplorer software 406 is an integrated application that operates with the ANSYS Workbench software to perform parametric analysis. The ANSYS DesignXplorer software 406 includes correlation, design of experiments, response surface creation and analysis, optimization and six sigma analysis. A version of the ANSYS DesignXplorer software 406 may, for example, be configured to perform the DoE and ROM extraction operations described above with reference to steps 106, 114 and 118 of FIGS. 1 and 3. The ROM Viewer software 408 may be a parametric viewer software application, which is configured for evaluating a ROM for any input parameter values and displaying the corresponding results on a desktop or web browser.

In embodiments, ROM setup operations 404 may be performed during the ROM productions processes depicted in FIGS. 1 and/or 3. For example, in certain embodiments ROM setup 404 may be performed (for example using the ANSYS Fluent software 404) as part of step 104 depicted in FIGS. 1 and 3. One illustrative example of a ROM production workflow using ANSYS Fluent software 404 is depicted in FIGS. 8-15. In addition, an illustrative example of ROM setup is depicted in FIGS. 20-21.

Figure 8:
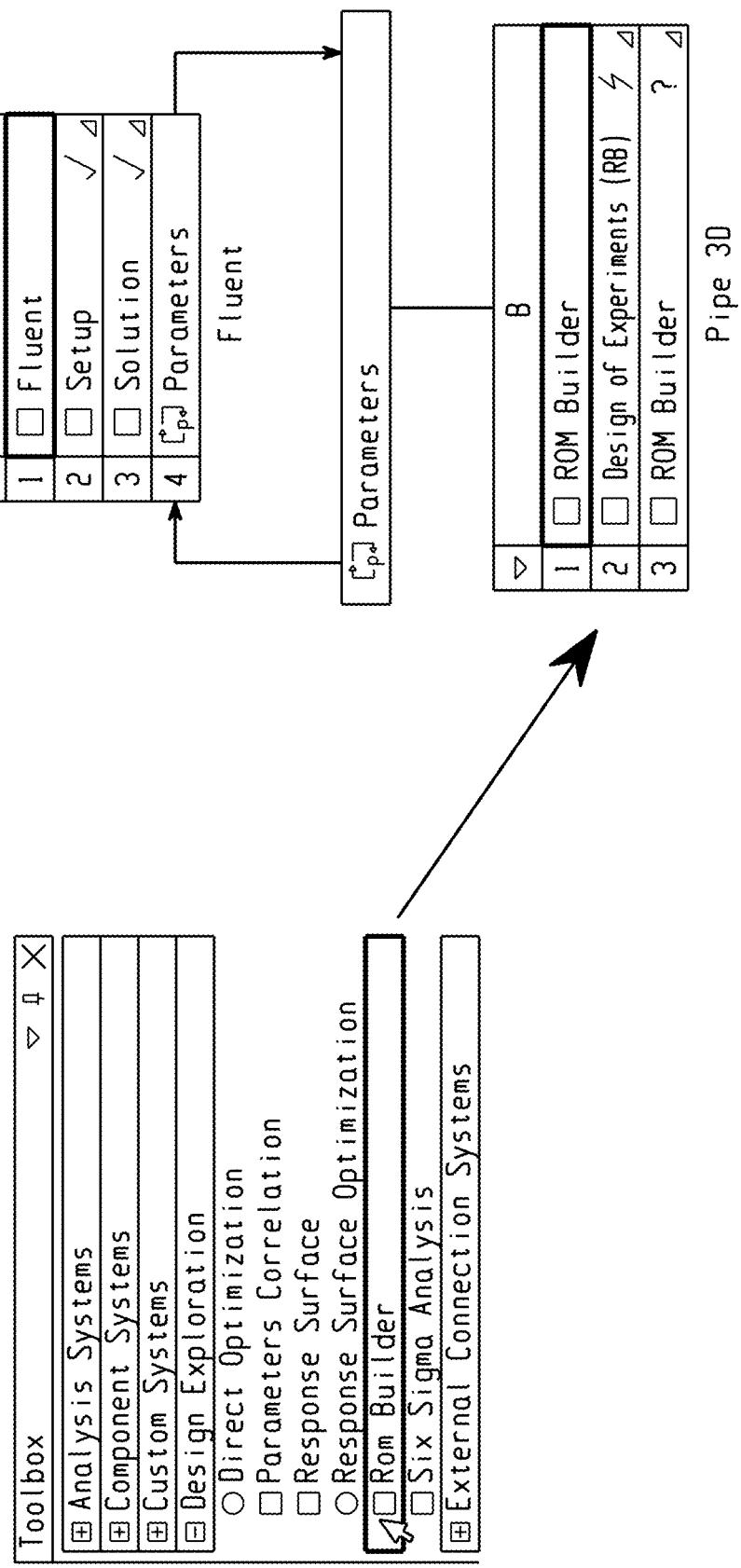
Figure 10:
Figure 12A:
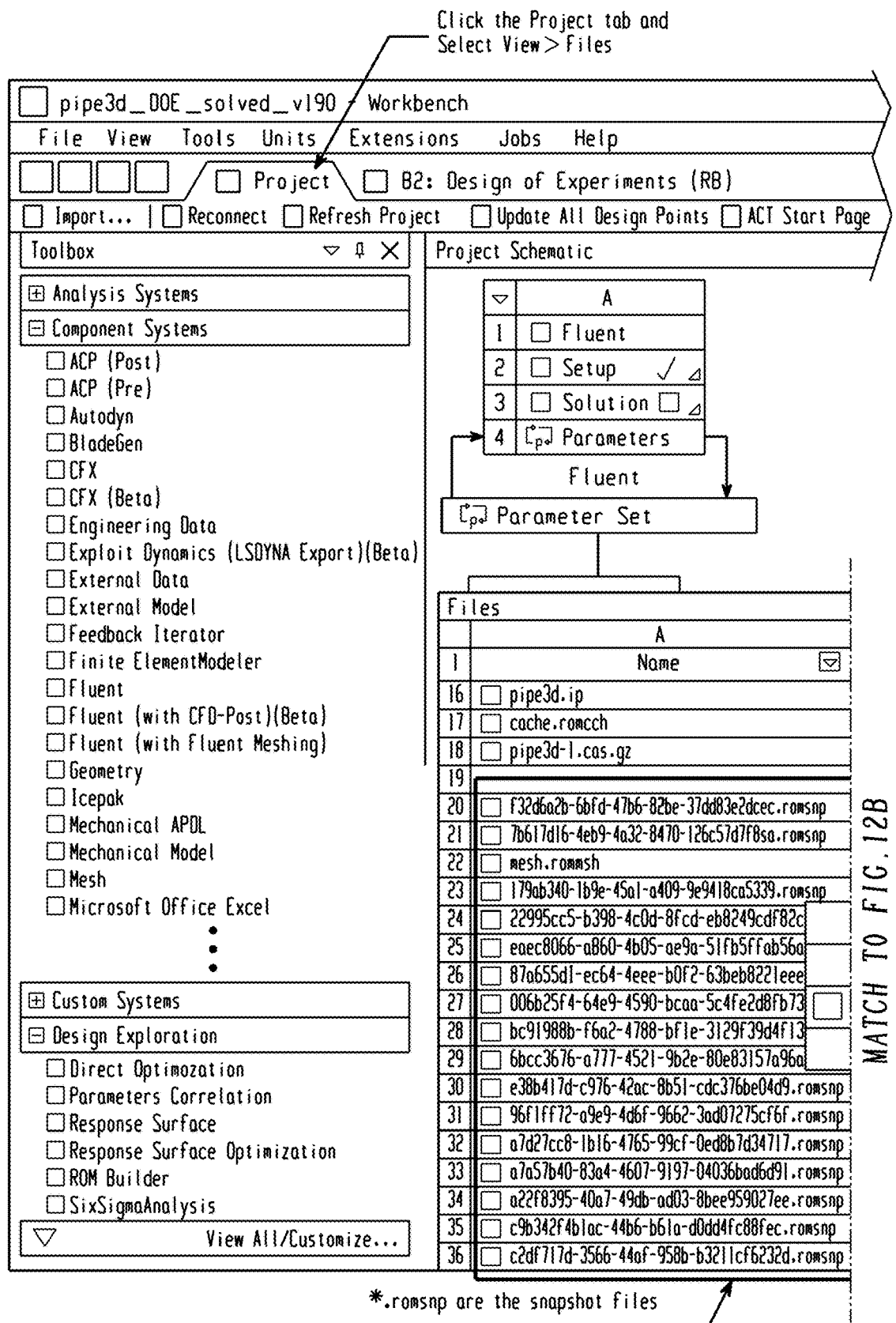

With reference first to FIGS. 8-15, in the first step of the illustrated example, shown in FIG. 8, a ROM Builder system is inserted into a Workbench Project Schematic for the ANSYS Fluent software. Then, as depicted in FIG. 9, the Design of Experiment properties may be set by (1) selecting the option to edit the Design of Experiment component, and (2) selecting the Design of Experiment node. The bounds for each input parameter are then edited, as shown in FIG. 10, by selecting the input parameter in the Outline View and editing the lower and upper bounds in the Properties View. For instance, in the illustrated example, the parameter "P3-V-inlet-2" is shown being set to 0.02 to 1 m s^−1, and the upper and lower bounds for the parameters "P1-temperature-1," "P2-temperature-2", and "P4-V-inlet-1," may be similarly edited. The design points (DP) in the Design of Experiments may then be updated to reflect the edited parameters by selecting the Update button in the Design of Experiments component, as shown in FIG. 11, producing a snapshot file for each design point. The generated snapshot files may be verified, as shown in FIG. 12, by selecting View>Files in the Project tab and right-clicking on each snapshot file to view its contents.

Figure 14A:
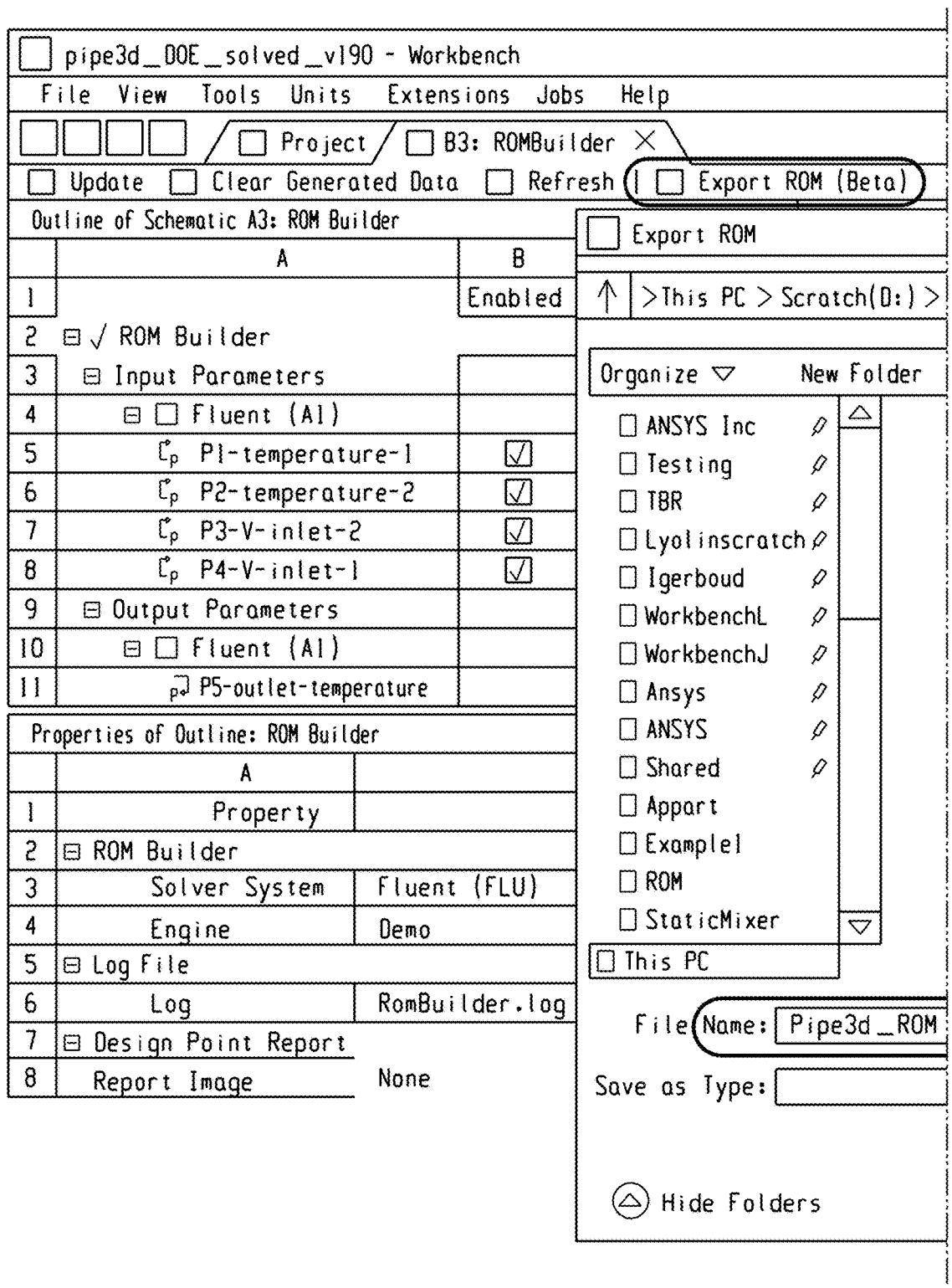
Figure 14B:
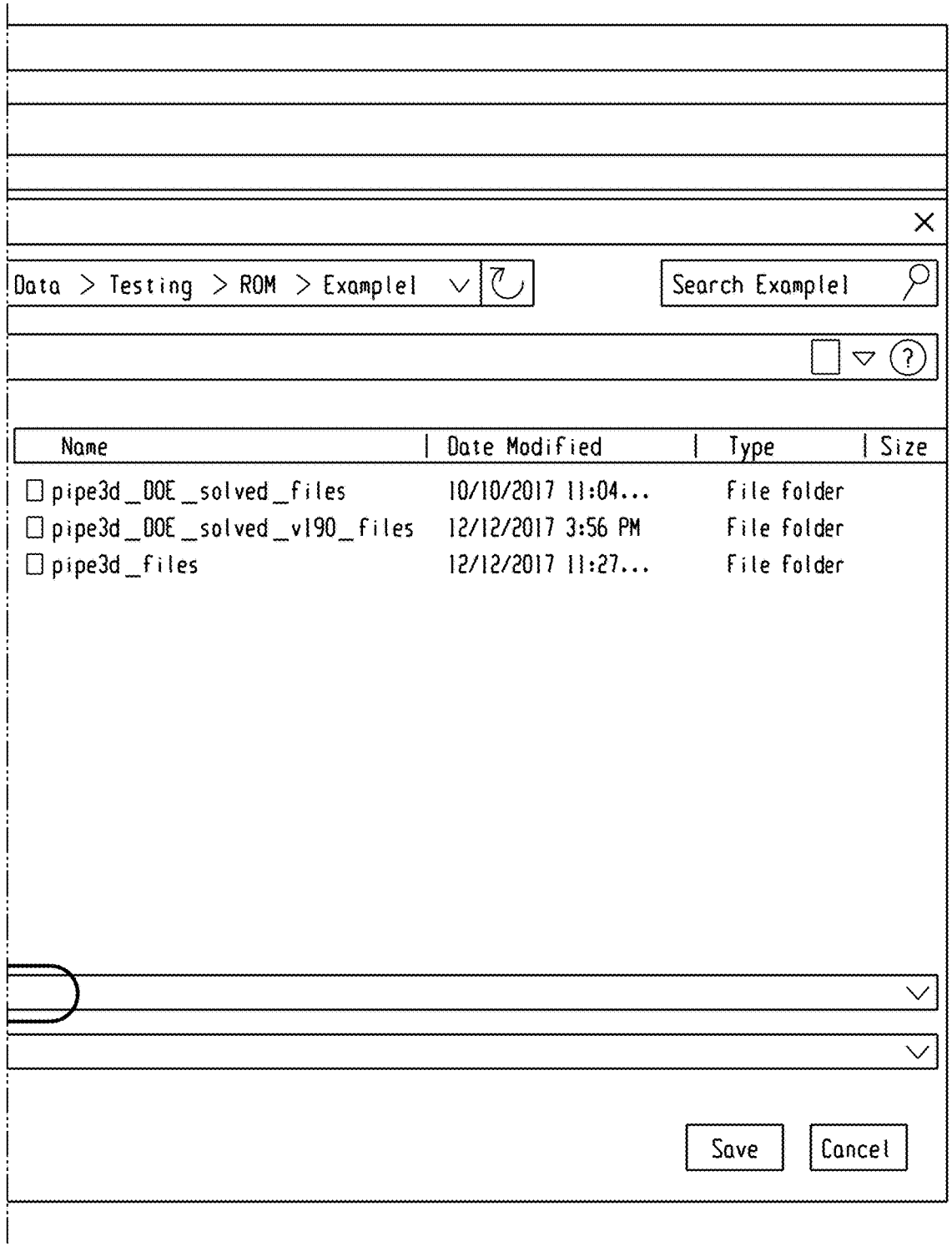
Figure 15A:
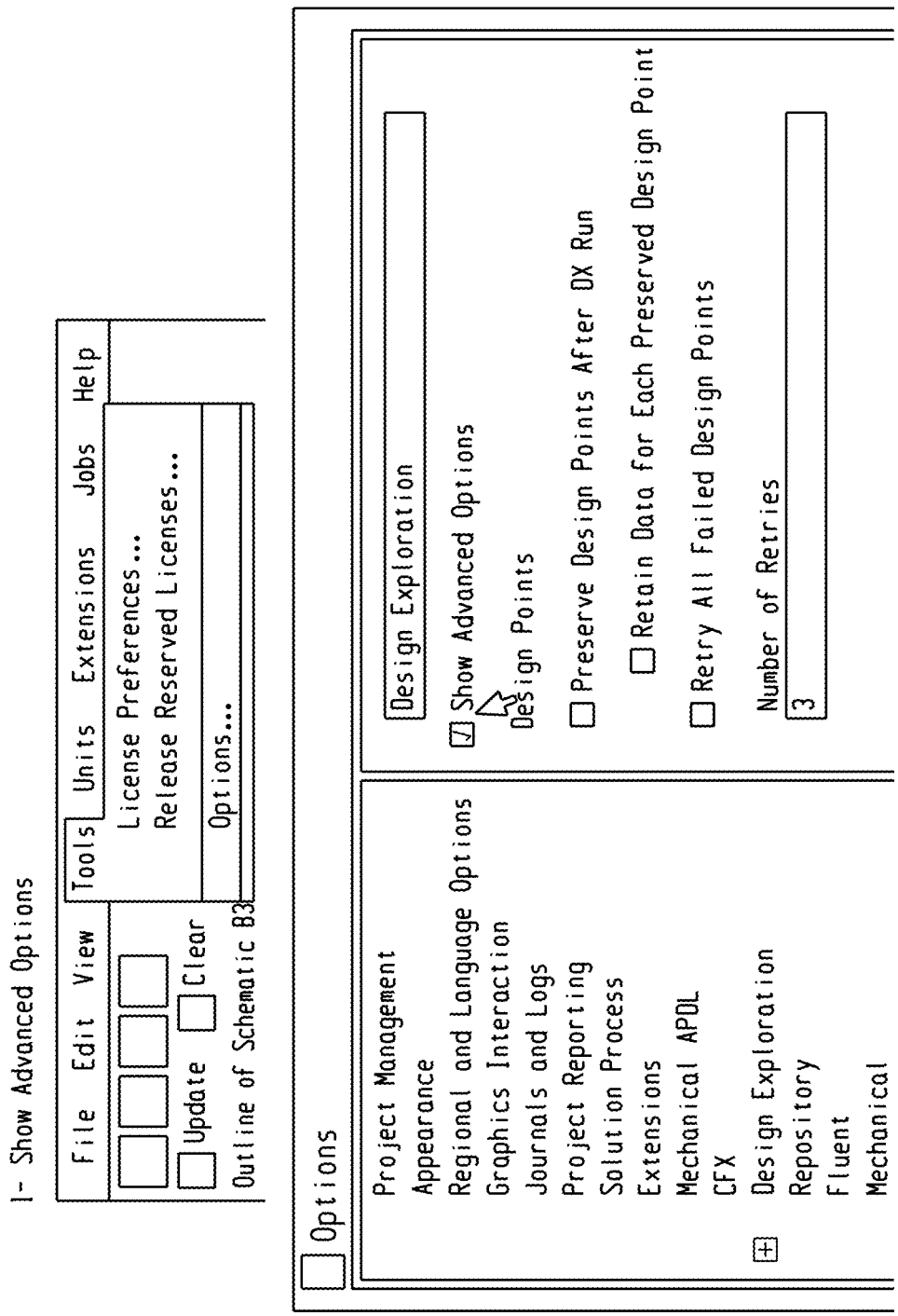

As shown in FIG. 13, the ROM may be produced in the illustrated example by selecting the ROM Builder>Edit component from the project schematic, selecting ROM Builder from the Outline view, selecting Fluent (FLU) as the solver system in the Properties component, and then selecting Update from the toolbar. This example operation will build the ROM with default settings, Construction Type=Fixed Number of Modes, Number of Modes=10. The ROM may then be exported from the toolbar and saved, as shown in FIG. 14. The Log File for the generated ROM may be accessed, as shown in FIG. 15, by selecting the Show Advanced Options function from the toolbar, selecting the ROM Builder node from the Outline view, and then selecting the ROM .log file from the properties view. In embodiments, there may be two types of export formats, such as a .romz format to be imported in ANSYS products (such as Workbench or ROM Viewer), and a .fmu file format to be imported in tools supporting the fmi 2.0 standard implementation (Such as the ANSYS Twin Builder).

With reference to the illustrative example of ROM setup depicted in FIGS. 20-21, an example ROM Setup template is illustrated in FIG. 20. ROM setup is about associating physical results (selected from among possible mesh-based results exposed by the 3D solver) with an area of interest in the geometric model. As illustrated in FIG. 20, this association defines a ROM Setup entry. A ROM result is available for each ROM Setup entry during consumption workflows. In addition, some ROM Setup entries may be grouped in different ways to produce an associated ROM, as illustrated in FIG. 21 which shows an example ROM Setup implementation in Fluent.

With reference again to FIG. 4, the ROM consumption components 304 may include a wide variety of applications, including for example Internet of Things (IoT) and digital twins applications. The example illustrated in FIG. 4 shows that the ROM 306 may be utilized by one or more ROM post-processing and/or system tools 320, 322 to generate simulation data 324. A ROM post-processing tool 320 may, for example, be a ROM viewer application, or a post-processing application for a 3D simulation application (e.g., ANSYS Fluent, ANSYS Mechanical, etc.) that is configured to import and reuse a ROM as a component of a more complex model or as a part of a multi-physics simulation. An example of a system tool 322 is the ANSYS Simploror software sold by Ansys, Inc. of Canonsburg, Pa. In a system simulation, several components may be linked together to modelize a full system. For example, one component may be a 3D simulation performed using the ANSYS Fluent software. The ROM application in this context may, for example, replace a component of the full system modelization, enabling system simulation to take advantage of 3D physic results accuracy in real time.

Figure 6:
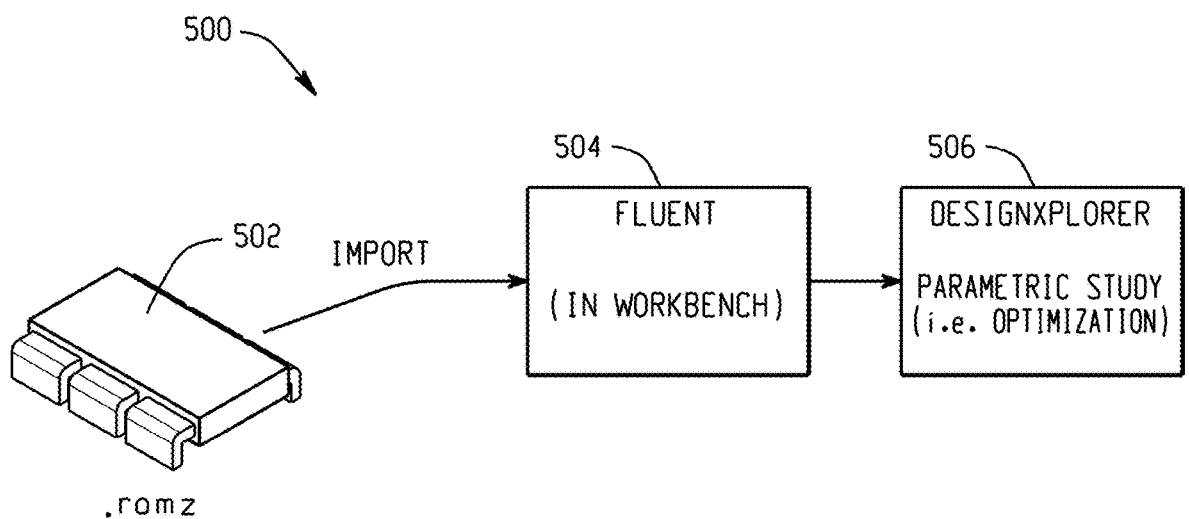
FIGS. 6 and 7 depict examples of software tools that may be used for ROM consumption.
Figure 7:
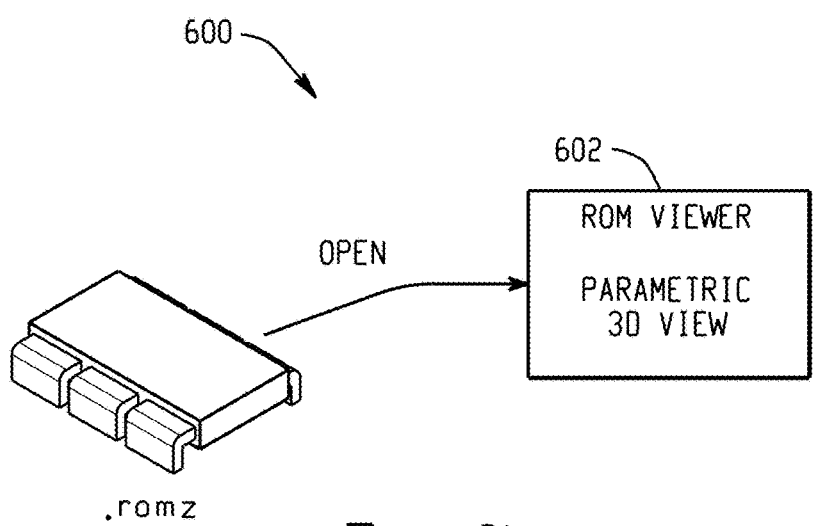

Examples of software tools that may be utilized for the ROM consumption components 304 are set forth in FIGS. 6 and 7. FIG. 6 illustrates an example 500 in which a ROM 502 is utilized to perform a parametric study using the ANSYS Fluent and DesignXplorer software applications 504, 506. If the example shown in FIG. 6 were performed without the use of ROM 502, it would depict a standard optimization workflow where the user defines a parametric simulation in ANSYS Fluent and then uses ANSYS DesignXplorer to run an optimization process. The ANSYS DesignXplorer software would drive ANSYS Fluent to solve the model for various input parameter values until it reaches the goal of the parametric study (e.g., to minimize an output parameter.) Without the use of ROM 502, each simulation may cost hours, if not days of CPU time. Adding ROM 502 to the illustrated workflow 500, the ROM 502 is imported into ANSYS Fluent, which is instructed to evaluate the ROM (instead of ANSYS Fluent performing a full simulation for each new input parameter configuration.) As a result, the parametric study is performed much quicker, for example with each point being computed within a few seconds on standard hardware. One example of ROM consumption for performing a parametric study is depicted in FIGS. 16-17.

As shown in FIG. 16A, a generated ROM may be selected for evaluation using the ANSYS Fluent software by first creating a new workbench project, inserting a Fluent system, selecting the Setup>Import ROM operation, and then selecting the desired ROM file. An evaluation may then be run, as shown in FIG. 16B, by selecting the Solution>Update operation, and then running a ROM evaluation instead of a real solution. An example of a generated evaluation and contour display is shown in FIG. 17.

FIG. 7 illustrates an example 600 in which a ROM viewer application 602 is utilized to perform a what/if analysis based on ROM results. As explained above, a ROM viewer software application 602 may be a parametric viewer software application, which is configured for evaluating a ROM for any input parameter values and displaying the corresponding results on a desktop or web browser. One example of ROM consumption using a ROM viewer software application 602 is depicted in FIGS. 18-19.

In the example shown in FIG. 18, a ROM file is selected for viewing in the ROM Viewer application, and data is loaded to the Viewer by selecting the Validate operation. An example ROM Viewer operation is shown in FIG. 19, where a user may set the input parameter values, select a result to display, and then select the Evaluate operation. The resultant display may be manipulated for evaluation, for example by zooming in and out, rotating the object in the display field, or performing a translation operation.

It should be appreciated that the technology disclosed herein provides non-intrusive systems and methods for building a parametric ROM of a full solver model. The technology is non-intrusive in the sense that it uses existing field results of the solver and does not require residual evaluation or access to the solver's internal operators. The resultant ROM may be consumed to provide a good approximation of the solver field results much faster than the classical solver for any point taken in the parametric space.

Systems and methods as described herein can be performed in a variety of ways using a variety of components and apparatuses. For example, in one embodiment, a set of learning points is identified in a parametric space (e.g., a space of possible combinations of values for different parameters contained in a mathematical model). A 3D physical solver (e.g., a processing system for that provides a numerical output based on input data representative of physical objects or phenomena using one or more data processors) may be used to perform a simulation (e.g., a computer-implemented imitation of a real-world process or system using one or more models) for each learning point in the set of learning points to generate a learning data set, where the 3D physical solver is selected from a plurality of compatible 3D physical solvers for simulating different physical aspects of a product or process. The learning data set may be compressed to reduce the learning data set to a smaller set of vectors. Coefficients (e.g., numerical values) from the learning data set and the smaller set of vectors may then be used to interpolate a set of coefficients within a design space (e.g., a multidimensional combination or interaction of input variables) for the reduced order model.

The methods and systems described herein may be implemented using any suitable processing system with any suitable combination of hardware, software and/or firmware, such as described below with reference to the non-limiting examples of FIGS. 22, 23A, 23B and 23C.

Figure 22:
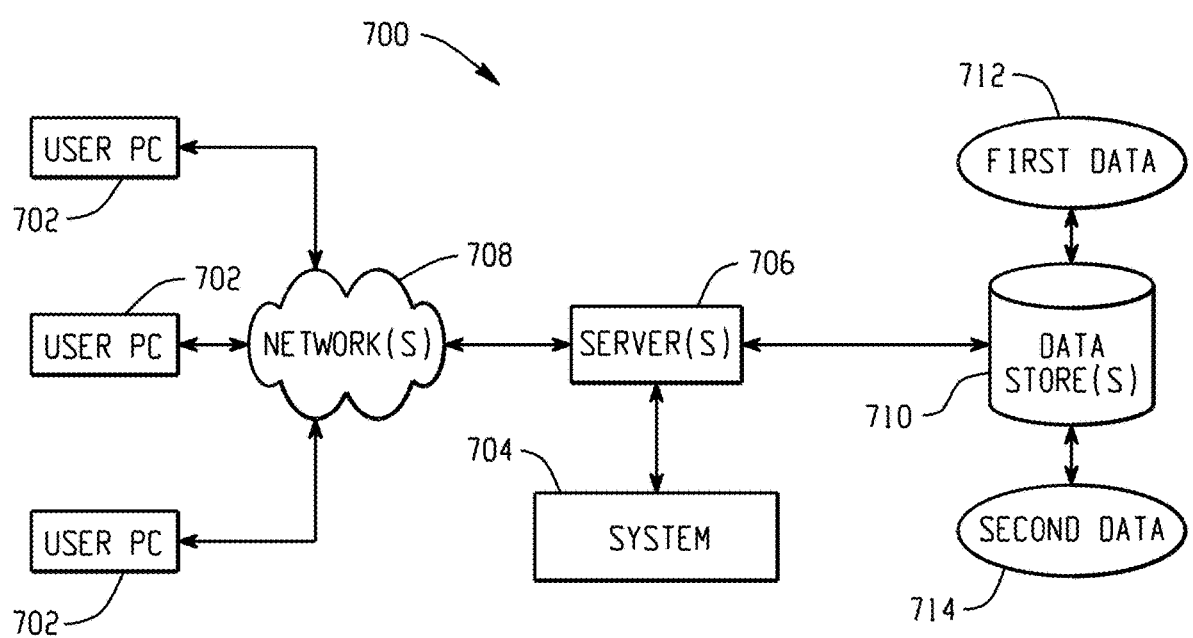

FIG. 22 depicts at 700 a computer-implemented environment wherein users 702 can interact with a system 704 hosted on one or more servers 706 through a network 708. The system 704 contains software operations or routines. The users 702 can interact with the system 704 through a number of ways, such as over one or more networks 708. One or more servers 706 accessible through the network(s) 708 can host system 704. It should be understood that the system 704 could also be provided on a stand-alone computer for access by a user.

Figure 23A:
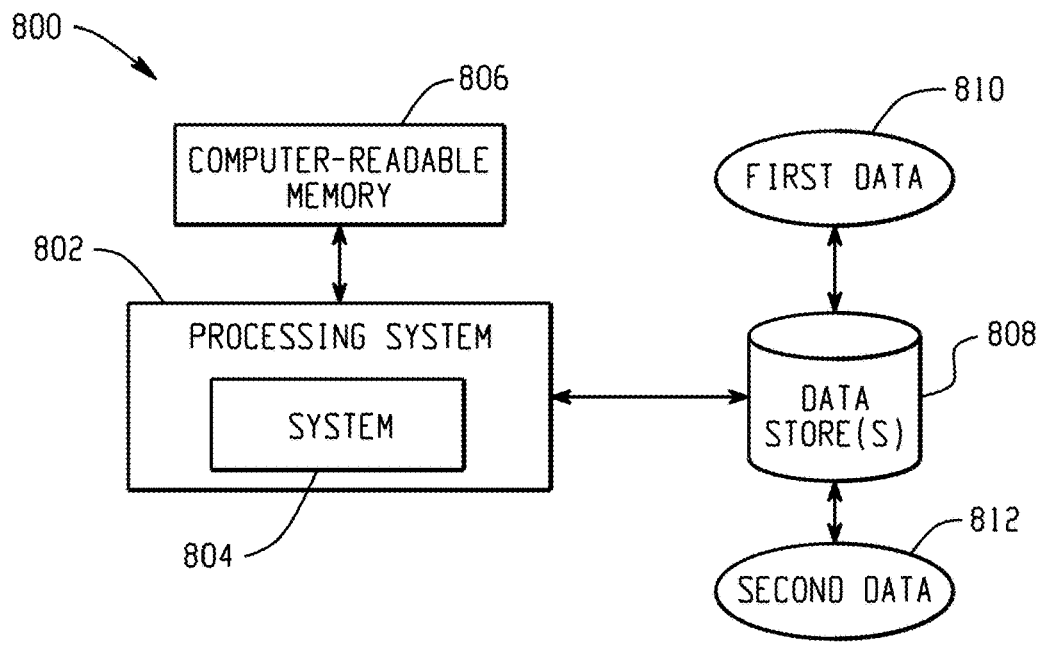
Figure 23B:
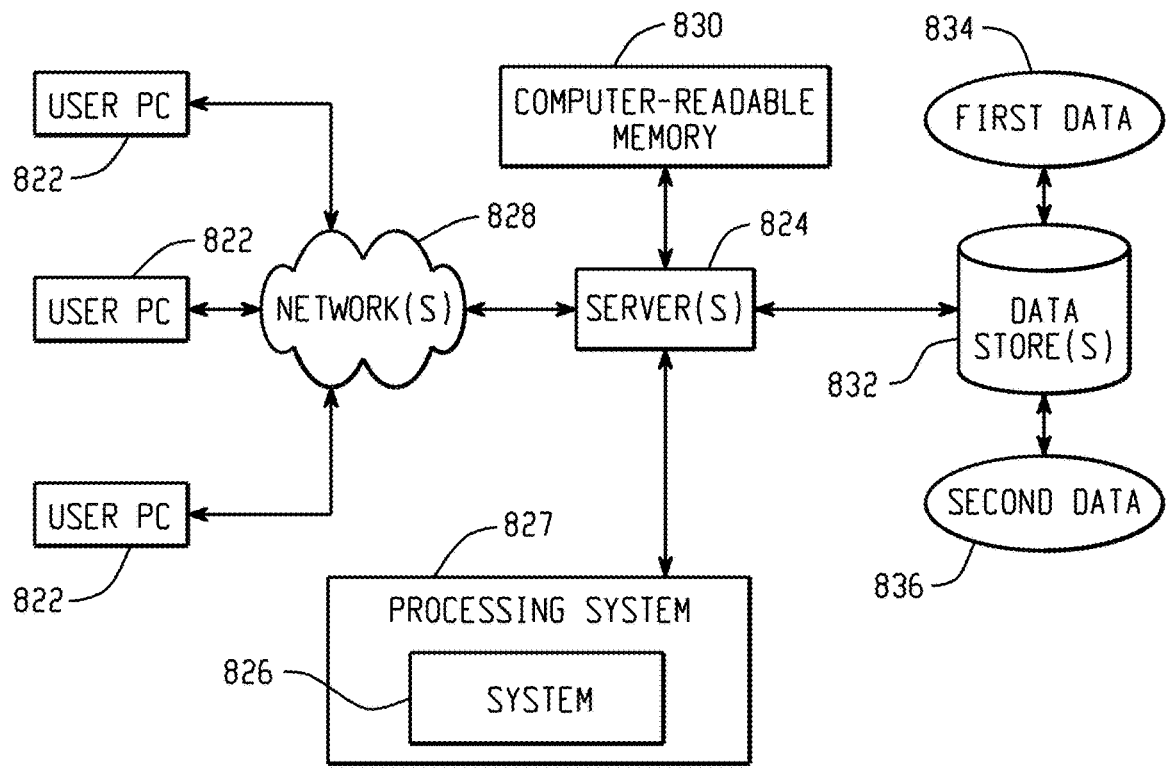
Figure 23C:
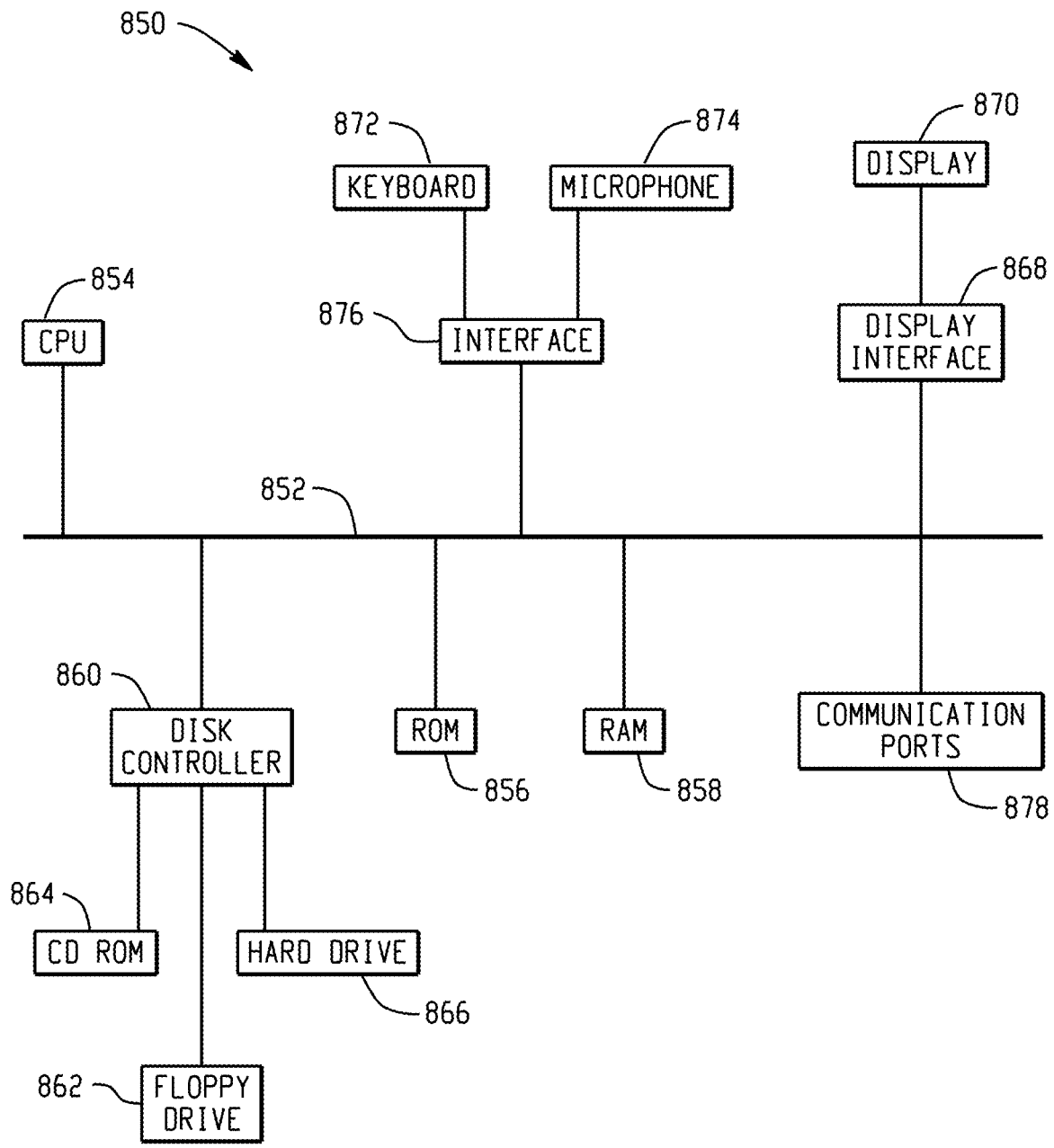

FIGS. 23A, 23B, and 23C depict example systems for use in implementing a system. For example, FIG. 23A depicts an exemplary system 800 that includes a standalone computer architecture where a processing system 802 (e.g., one or more computer processors) includes a system 804 being executed on it. The processing system 802 has access to a non-transitory computer-readable memory 806 in addition to one or more data stores 808. The one or more data stores 808 may contain first data 810 as well as second data 812.

FIG. 23B depicts a system 820 that includes a client server architecture. One or more user PCs 822 accesses one or more servers 824 running a system 826 on a processing system 827 via one or more networks 828. The one or more servers 824 may access a non-transitory computer readable memory 830 as well as one or more data stores 832. The one or more data stores 832 may contain first data 834 as well as second data 836.

FIG. 23C shows a block diagram of exemplary hardware for a standalone computer architecture 850, such as the architecture depicted in FIG. 23A, that may be used to contain and/or implement the program instructions of system embodiments of the present disclosure. A bus 852 may serve as the information highway interconnecting the other illustrated components of the hardware. A processing system 854 labeled CPU (central processing unit) (e.g., one or more computer processors), may perform calculations and logic operations required to execute a program. A non-transitory computer-readable storage medium, such as read only memory (ROM) 856 and random access memory (RAM) 858, may be in communication with the processing system 854 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 860 interfaces one or more disk drives to the system bus 852. These disk drives may be external or internal floppy disk drives such as 862, external or internal CD-ROM, CD-R, CD-RW or DVD drives such as 864, or external or internal hard drives 866.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 856 to be displayed on a display 870 in audio, graphic, or alphanumeric format. Communication with external devices may occur using various communication ports 878.

In addition to the standard computer-type components, the hardware may also include data input devices, such as a keyboard 872, or other input device 874, such as a microphone, remote control, pointer, mouse and/or joystick.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, C#, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for generating a reduced order model, comprising:
    identifying a set of learning points in a design space derived from two or more different parameters having respective ranges;
    using a 3D physical solver to perform a simulation based on a full order model for each learning point to generate a learning data set, the 3D physical solver for simulating a physical aspect of a product or process;
    reducing the learning data set to an orthonormal set of vectors via a compression process; and
    using mode coefficients from the learning data set and the orthonormal set of vectors to generate the reduced order model, the reduced order model to provide approximated results for the 3D physical solver in the design space based on a linear combination of the orthonormal set of vectors with two or more parameters.

2. The computer-implemented method of claim 1, further comprising:
    comparing a validation solution from the learning data set with a solution approximated using the reduced order model to determine an accuracy level of the reduced order model.

3. The computer-implemented method of claim 2, further comprising:
    in response to the accuracy level being below a desired value, increasing a number of learning points in the set of learning points and repeating the operations of using the 3D physical solver, reducing the learning data, and using the mode coefficients from the learning data set.

4. The computer-implemented method of claim 2, further comprising:
    in response to the accuracy level being below a desired value, increasing a number of vectors in the orthonormal set of vectors, and repeating the operations of using the 3D physical solver, reducing the learning data, and using the mode coefficients from the learning data set.

5. The computer-implemented method of claim 1, wherein the set of learning points is identified using a design of experiments (DoE) sampling operation.

6. The computer-implemented method of claim 1, wherein the compression process comprises a truncated singular value decomposition (SVD) process.

7. The computer-implemented method of claim 1, wherein a number of vectors in the smaller set of vectors is determined based on a user-selected accuracy parameter.

8. The computer-implemented method of claim 1, wherein the full set of mode coefficients for the reduced order model is interpolated using a genetic aggregation response surface process.

9. The computer-implemented method of claim 1, wherein the two or more parameters in the full order model comprise a nonlinear dependency.

10. A system for generating a reduced order model, comprising:
    one or more processors;
    one or more non-transitory computer readable medium; and
    a reduced order model (ROM) builder software application stored on the one or more non-transitory computer readable medium and executable by the one or more processors, the ROM builder software application, when executed, being configured to, receive a set of learning points in a design space derived from two or more different parameters having respective ranges, cause a 3D physical solver to perform a simulation based on a full order model for each learning point to generate a learning data set, the 3D physical solver for simulating a physical aspect of a product or process, reduce the learning data set to an orthonormal set of vectors via a compression process, and use mode coefficients from the learning data set and the orthonormal set of vectors to generate the reduced order model, the reduced order model to provide approximated results for the 3D physical solver in the design space based on a linear combination of the orthonormal set of vectors with the two or more parameters.

11. The system of claim 10, wherein the ROM builder software application, when executed, being further configure to:

compare a validation solution with a solution from the learning data set approximated using the reduced order model to determine an accuracy level of the reduced order model.

12. The system of claim 11, wherein the ROM builder software application, when executed, being further configure to:

in response to the accuracy level being below a desired value, increase a number of learning points in the set of learning points and repeat the operations of using the 3D physical solver, reducing the learning data, and using the mode coefficients from the learning data set.

13. The system of claim 11, wherein the ROM builder software application, when executed, being further configure to:

in response to the accuracy level being below a desired value, increase a number of vectors in the orthonormal set of vectors and repeat the operations of using the 3D physical solver, reducing the learning data, and using the mode coefficients from the learning data set.

14. The system of claim 10, wherein the set of learning points is derived by the 3D solver using a design of experiments (DoE) sampling operation.

15. The system of claim 10, wherein the compression process comprises a truncated singular value decomposition (SVD) process.

16. The system of claim 10, wherein a number of vectors in the orthonormal set of vectors is determined based on a user-selected accuracy parameter.

17. The system of claim 10, wherein the full set of mode coefficients for the reduced order model is interpolated using a genetic aggregation response surface process.

18. The system of claim 10, wherein the two or more parameters in the full order model comprises a nonlinear dependency.

19. A reduced order model (ROM) builder software application stored on a non-transitory computer readable medium and executable by one or more processors, the ROM builder software application, when executed, being configured to:

determine, using an optimal space filling technique, a set of learning points in a design space derived from two or more different parameters having respective ranges;

cause a 3D physical solver to perform a simulation based on a full order model for each learning point to generate a learning data set, the 3D physical solver for simulating a physical, aspect of a product or process;

reducing the learning data set to an orthonormal set of vectors via a compression process; and use mode coefficients from the learning data set and the orthonormal set of vectors to generate the reduced order model, the reduced order model to provide approximated results for the 3D physical solver in the design space based on a linear combination of the orthonormal set of vectors with two or more parameters.

20. The ROM builder software application of claim 19, wherein the two or more parameters in the full order model comprise a nonlinear dependency.

* * * * *